United States Patent
Lagakos et al.

(10) Patent No.: US 7,646,946 B2
(45) Date of Patent: Jan. 12, 2010

(54) INTENSITY MODULATED FIBER OPTIC STRAIN SENSOR

(75) Inventors: Nicholas Lagakos, Silver Spring, MD (US); Joseph A Bucaro, Herndon, VA (US); Jacek Jarzynski, Bethesda, MD (US); Barbara Jarzynski, legal representative, Bethesda, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 34 days.

(21) Appl. No.: 12/113,749

(22) Filed: May 1, 2008

(65) Prior Publication Data

US 2009/0252451 A1  Oct. 8, 2009

Related U.S. Application Data

(60) Provisional application No. 61/042,029, filed on Apr. 3, 2008.

(51) Int. Cl.
*G02B 6/00* (2006.01)
*G01J 1/04* (2006.01)

(52) U.S. Cl. .............................. 385/13; 385/12; 385/88; 385/89; 250/227.11; 250/227.14; 250/227.18

(58) Field of Classification Search ................... 385/12, 385/13, 123.14, 31, 37, 27, 28, 38, 47, 49, 385/51, 1, 5, 88, 89, 92, 94; 250/227.11, 250/227.14, 227.18, 227.19, 230, 238, 239; 356/352
See application file for complete search history.

(56) References Cited

U.S. PATENT DOCUMENTS

| | | | |
|---|---|---|---|
| 4,162,397 A | 7/1979 | Bucaro et al. |
| 4,238,856 A | 12/1980 | Bucaro et al. |
| 4,363,114 A | 12/1982 | Bucaro et al. |
| 4,427,263 A | 1/1984 | Lagakos et al. |
| 4,482,205 A | 11/1984 | Lagakos et al. |

(Continued)

OTHER PUBLICATIONS

Bucaro, J.A., and N. Lagakos,"Fiber Optics Pressure and Acceleration Sensors", Proceeding of the 47th International Instrument symposium, Denver, CO (May 6-10, 2001).

(Continued)

*Primary Examiner*—Brian M Healy
(74) *Attorney, Agent, or Firm*—John J. Karasek; Sally A Ferrett

(57) ABSTRACT

A strain sensor includes an optical fiber with at least one optical fiber, a reflector body with a reflective surface, a housing affixed to the optical fiber probe and to the reflector body. The reflective surface is spaced apart at a distance d from the ends of the probe's fibers and receives light from the end of the fiber and to reflect at least a portion of the light into the end of the fiber. The housing is attached to the fiber probe at a first end of the housing and attached to the reflector body at a second end of the housing. The housing is affixed to the material to be measured, and in the material causes a change in gap between the fiber end and the reflective surface, modulating the amount of light received in the receiving fiber, detectable by a photodetector connected to the receiving fiber.

26 Claims, 24 Drawing Sheets

U.S. PATENT DOCUMENTS

| | | | |
|---|---|---|---|
| 4,621,896 A | | 11/1986 | Lagakos et al. |
| 4,749,856 A | * | 6/1988 | Walker et al. ........... 250/227.11 |
| 4,979,798 A | | 12/1990 | Lagakos et al. |
| 4,994,668 A | | 2/1991 | Lagakos et al. |
| 5,301,001 A | * | 4/1994 | Murphy et al. ............. 356/35.5 |
| 5,345,519 A | * | 9/1994 | Lu .............................. 385/12 |
| 5,367,376 A | | 11/1994 | Lagakos et al. |
| 5,594,819 A | * | 1/1997 | Narendran et al. ............ 385/12 |
| 5,633,960 A | | 5/1997 | Lagakos et al. |
| 5,726,744 A | * | 3/1998 | Ferdinand et al. ............. 356/32 |
| 5,805,753 A | | 9/1998 | Lagakos et al. |
| 5,825,489 A | | 10/1998 | Lagakos et al. |
| 6,118,534 A | | 9/2000 | Miller |
| 6,281,976 B1 | | 8/2001 | Taylor et al. |
| 6,539,136 B1 | | 3/2003 | Dianov et al. |
| 6,577,402 B1 | | 6/2003 | Miller |
| 6,738,145 B2 | | 5/2004 | Sherrer et al. |
| 6,998,599 B2 | | 2/2006 | Lagakos et al. |
| 7,149,374 B2 | | 12/2006 | Lagakos et al. |
| 7,379,630 B2 | | 5/2008 | Lagakos et al. ............... 385/12 |
| 7,460,740 B2 | | 12/2008 | Lagakos et al. ............... 385/12 |
| 2004/0099800 A1 | | 5/2004 | Lagakos et al. ............... 385/12 |
| 2004/0151417 A1 | | 8/2004 | Lagakos et al. ............... 385/12 |
| 2009/0252451 A1 | * | 10/2009 | Lagakos et al. ............... 385/13 |

OTHER PUBLICATIONS

Bucaro, J.A., and N. Lagakos, "Lightweight Fiber Optics Microphones and Accelerometers," Review of Scientific Instruments, vol. 72, pp. 2816-2821 (Jun. 2001).

Lagakos, N., Cole, J.H., and Bucaro, J. "Microbend Fiber-optic Sensor," Applied Optics 26, p. 2171-2180 (Jun. 1987).

He, G. and Cuomo, F.W., "Displacement Response, Detection Limit, and Dynamic Range of Fiber-Optic Lever Sensors", J. Lightwave Tech., vol. 9, No. 11, Nov. 1991, pp. 1618-1625.

Hu, A., Cuomo, F.W., Zuckerwar, J., "Theoretical and Experimental Study of a Fiber Optic Microphone", J. Acoustical Society of America, vol. 91, pp. 3049-3060, 1992.

Kersey, A.D., Berkoff, T.A. and Morey, W.W., "Multiplexed fiber Bragg grating strain-sensor system with a fiber Fabry-Perot wavelength filter", Optics Letters, vol. 18, p. 1370-1372 (1993).

Krohn, D.A., Fiber Optic Sensors—Fundamentals and Applications, Instrument Society of America, Research Triangle Park, NC, Chapters 3 and 8, 1992.

Miers, D.R. ,Raj, D., Berthold, J.W. , "Design and characterization of fiber optic accelerometer," Fiber Optic and Laser Sensors V, Proc. Soc., SPIE vol. 838, pp. 314-317 (1987).

Yuan et al., "Recent progress of white light interferometric fiberoptic strain sensing techniques", Rev. Scient. Instr., vol. 71, pp. 4648-4654 (2000).

Zuckerwar, A.J., Cuomo, T.D., Nguyen, T.D., Rizzi, S.A., Clevenson, S.A., "High Temperature Fiber-Optic Lever Microphones", J. Acoustical Society of America, vol. 97, Issue 6, pp. 3605-3616, Jun. 1995.

* cited by examiner

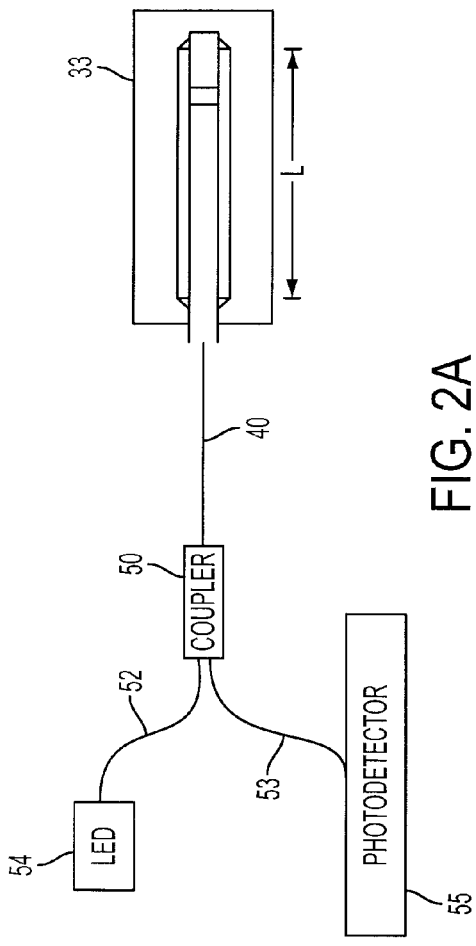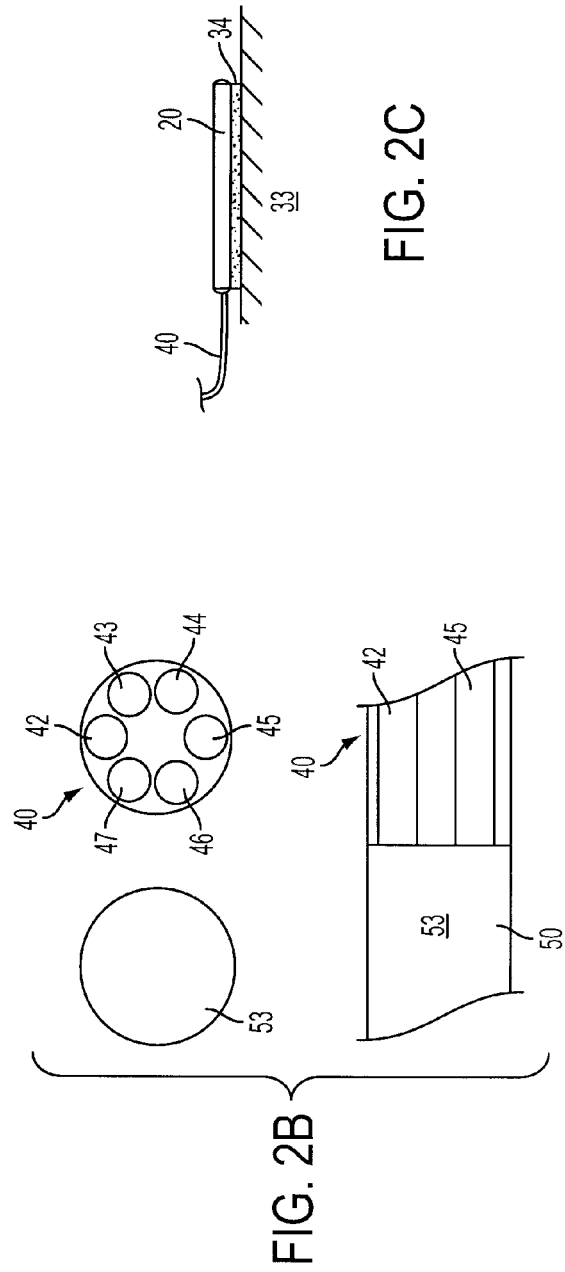

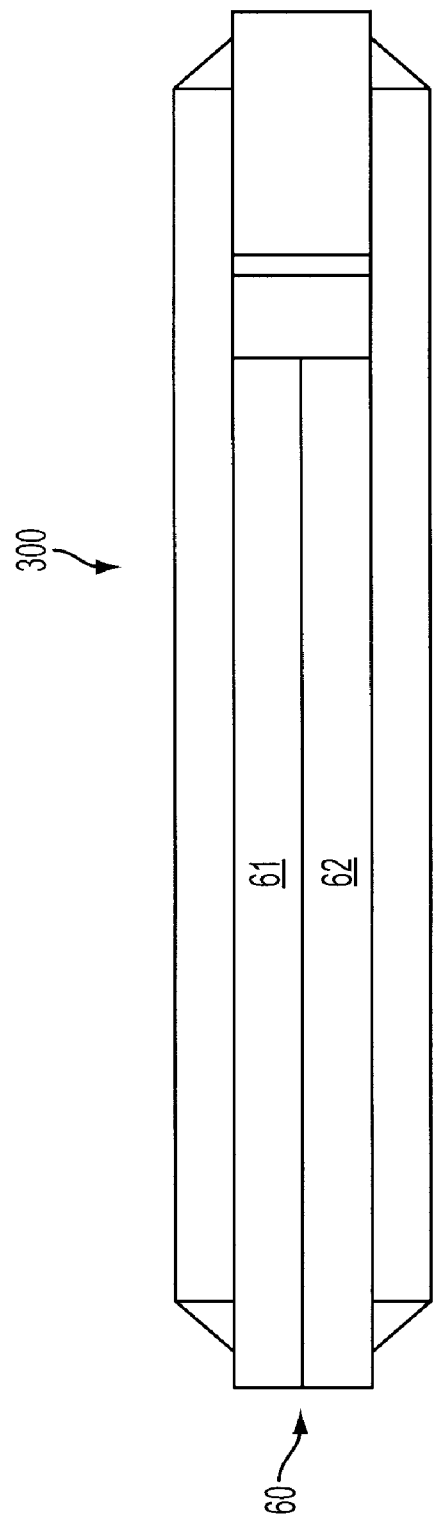
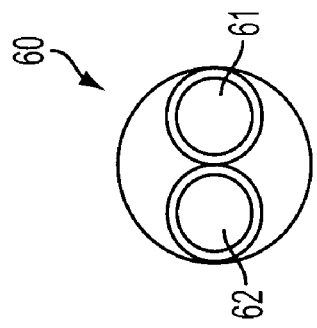

TABLE 1
FIBER OPTIC STRAIN SENSOR: COST ANALYSIS

| COMPONENT | DESCRIPTION | COST | WEIGHT PER UNIT |
|---|---|---|---|
| CURRENT SOURCE | WAVELENGTH ELECTRONICS LDD200-1M | $50.18 | 13 gm |
| LED | optek OPF370A | $7 | 0.22 gm |
| FIBER | 200μm CORE OFS: CF01493-10 | $0.48/m; 14m/SENSOR $7 | 1 gm |
| F.O. STRAIN SENSOR | | $5 | 1 gm |
| PIN DETECTOR | ADVANCED PHOTONICS SD 100-41-21-231 | $29.50 | 1.13 gm |
| LED & PIN COUPLERS | FIS: #5014741 | $4.32/3+$4.32 $5.76 | 5.77 gm |
| FIBER CONNECTORS | FIS: #F1-0061830 | $2x4.10 $8.20 | 3.10 gm |
| TOTAL | | $113 | |

FIG. 22

TABLE II
STRAIN SENSORS
(SENSOR LENGTH: 1 cm)

| STRAIN SENSOR | MINIMUM DETECTABLE STRAIN | COST | MULTIPLEXING |
|---|---|---|---|
| FIBER OPTIC INTERFEROMETRIC SENSORS | (MINIMUM DETECTABLE PHASE: $10^{-5}$ RAD) $10^{-10}$ | VERY HIGH | COMPLEX |
| FIBER BRAGG GRATING SENSORS | $10^{-9}$ $10^{-7}$ | HIGH MEDIUM | FAIRLY COMPLEX FAIRLY SIMPLE |
| REFLECTANCE FIBER OPTIC STRAIN SENSOR | $4*10^{-9}$ | LOW | SIMPLE |
| SEMICONDUCTOR STRAIN GAGES | $10^{-8}$ | LOW | DIFFICULT |
| FIBER FABRY-PEROT STRAIN SENSORS | $2*10^{-8}$ $2*10^{-7}$ | MEDIUM LOW | FAIRLY SIMPLE SIMPLE |
| RESISTANCE STRAIN SENSORS | $10^{-6}$ | VERY LOW | DIFFICULT |

FIG. 23

INTENSITY MODULATED FIBER OPTIC STRAIN SENSOR

CROSS-REFERENCE TO RELATED APPLICATIONS

This Application is a Non-Provisional of Provisional (35 USC 119(e)) application 61/042,029 filed on Apr. 3, 2008, the entire disclosure of which is incorporated by reference herein.

BACKGROUND

1. Technical Field

This application is related to devices for sensing strain in materials, and more specifically, to devices and techniques for measuring dynamic strain in materials using a fiber optic sensor.

2. Related Technologies

Historically, strain has been measured using a resistance type strain gage or a semiconductor type strain gage. Both types measure the electrical resistance of the strain gage, which is a function of the applied strain.

Resistance-type strain gages typically include a grid of very fine wire or foil bonded to the backing or carrier matrix. The electrical resistance of the grid varies linearly with strain. The carrier matrix is bonded to the surface, force is applied, and the strain is found by measuring the change in resistance. These bonded resistance strain gages are inexpensive, robust, and suitable for low frequency or static strain measurements. However, in order to minimize electromagnetic interference, resistance type strain gage systems typically position the electronics very close to the strain sensor itself. Typical use of a Wheatstone bridge in the sensor makes multiplexing these gages difficult.

Semiconductor strain gages are more sensitive than the resistance strain gages, and are often used for dynamic strain measurements. However, they are more expensive, fragile, and are sensitive to temperature changes. They are also subject to electromagnetic interference, cannot operate remotely easily, and their multiplexing is difficult.

Fiber optic Bragg grating strain sensors are useful for very remote sensing applications, such as oil drilling. However, the detection electronics can be very expensive, and the strain detection limit of such a sensor is moderate, as discussed in A. D. Kersey, T. A. Berkoff, and W. W. Morey, "Multiplexed fiber Bragg grating strain-sensor system with a fiber Fabry-Perot wavelength filter", Optics Letters, Vol. 18, p 1370-1372 (1993). Formation of Bragg gratings in optical fibers is discussed in G. Meltz, W. W. Morey, and W. H. Glenn "Formation of Bragg gratings in optical fibers by a transverse holographic method", Opt. Lett., Vol. 14, p 823-825 (1989).

In the fiber Bragg sensors, the single mode fiber section with the Bragg grating written in it is glued to the sensing surface. Any change in the strain applied on the sensing surface along the direction of the fiber changes the Bragg grating periodicity which, in turn, changes the wavelength of the light reflected back by the Bragg grating. Thus, by detecting the reflected light wavelength modulation the applied strain can be detected. This reflected light wavelength modulation is the transduction mechanism of the sensor. Because even very long fiber leads do not introduce any reflected light wavelength modulation, these sensors are suitable for remote sensing. In addition, the sensor multiplexing capability is good since along the same fiber various different periodicity Bragg gratings can be utilized as different strain sensors. By using a broadband light source, light with different wavelengths is reflected from different Bragg gratings and can be detected separately. The Bragg grating sensor is ideal for very long distance strain sensing, such as in oil drilling. However, for most strain applications the detection electronics, which uses interferometric or non-interferometric schemes, is fairly complex and expensive.

Optical fiber has been used in other sensing applications, including microphone and microbend sensors, as disclosed in J. A. Bucaro and N. Lagakos, "Lightweight fiber optic microphones and accelerometers", Rev. Scient. Instr., Vol. 72, pages 2816-2821 (2001); G. He and F. W. Cuomo, "Displacement Response, Detection Limit, and Dynamic Range of Fiber-Optic Lever Sensors", J. Lightwave Technol. Vol 9, page 1618-1625; and in U.S. Pat. No. 7,020,354, U.S. Pat. No. 6,998,599, and U.S. Pat. No. 7,149,374.

Recently, fiber optic interferometric strain sensors have been introduced that are very sensitive, have a wide dynamic range, are immune to electromagnetic interference, can operate remotely, and can be multiplexed. Some interferometric sensors are described in E. Udd, Fiber Optic Sensors, p 271-323, 2006. Interferometric fiber optic strain sensors are discussed in Yuan et al., "Recent progress of white light interferometric fiberoptic strain sensing techniques", Rev. Scient. Instr., Vol. 71, pages 4648-4654 (2000).

Current transduction mechanisms are phase, wavelength, or intensity modulation. In phase modulated interferometric sensors, the phase of the light propagated in the sensing fiber of the interferometer changes when an applied strain changes. Interferometric sensors with Mach-Zehnder or Michelson interferometers can detect extremely small strains by using long sensing fibers. However, due primarily to polarization effects, these sensors are complex and expensive and, thus, their use is generally limited to special applications of weak strain signals.

Some strain sensors rely on Fabry-Perot interferometry. The Fabry-Perot interferometer is formed by the end of an optical fiber and another surface parallel to the fiber end. Most of these sensors use a laser and a single mode fiber to enhance the coherence of the interferometer. These sensors have high sensitivity, and their detection scheme is easier than that of the Mach-Zehnder or Michelson interferometric sensors.

BRIEF SUMMARY

An aspect of the invention is directed to a sensor for measuring strain in a material to which the sensor is attached. The sensor includes an optical fiber probe including at least one optical fiber, a reflector body with a reflective surface, a housing affixed to the optical fiber probe at a first end of the housing and affixed to the reflector body at a second end of the housing. The reflective surface is spaced apart at a distance d from the ends of the fibers and positioned to receive light from the end of the fiber and to reflect at least a portion of the light into the end of the fiber. In operation, the housing is affixed to the material along the length of the housing, and strain in the material causes a change in the distance d between the fiber end and the reflective surface, modulating the amount of light received in the receiving fiber.

An aspect of the invention is a strain sensor for measuring strain in a material, the sensor having an optical fiber probe including at least one optical fiber, a reflector body with a reflective surface, the reflective surface spaced apart at a distance d from the ends of the fibers and positioned to receive light from the end of the fiber and to reflect at least a portion of the light into the end of the fiber, and a housing affixed to the optical fiber probe at a first location and affixed to the reflector body at a second location, the distance L between the first location and the second location being greater than the distance d. In operation, strain in the material to which the housing is attached causes a change in the distance d between the fiber end and the reflective surface, and the change in the distance d modulates the amount of light received in the receiving fiber.

The optical can have one transmitting fiber and one receiving fiber, or can have one transmitting fiber and a plurality of receiving fibers.

Other aspects of the invention will be apparent from the following drawings and detailed description of embodiments of the invention.

BRIEF DESCRIPTION OF THE DRAWINGS

FIGS. 2A, 2B, and 2C illustrate the exemplary strain sensor of FIGS. 1A and 1B in operation.

FIG. 3 illustrates an embodiment of a strain sensor in which the fiber bundle includes one transmitting fiber and one receiving fiber.

FIG. 22 shows a cost analysis for exemplary embodiments of the strain sensor.

FIG. 23 compares the features of exemplary embodiments of the sensor with other strain sensor technology.

DETAILED DESCRIPTION OF EMBODIMENTS OF THE INVENTION

Figure 1A:
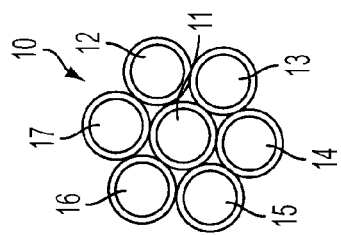
FIG. 1A illustrates an optical fiber bundle which forms part of an exemplary embodiment of a fiber optic strain sensor.
Figure 1B:
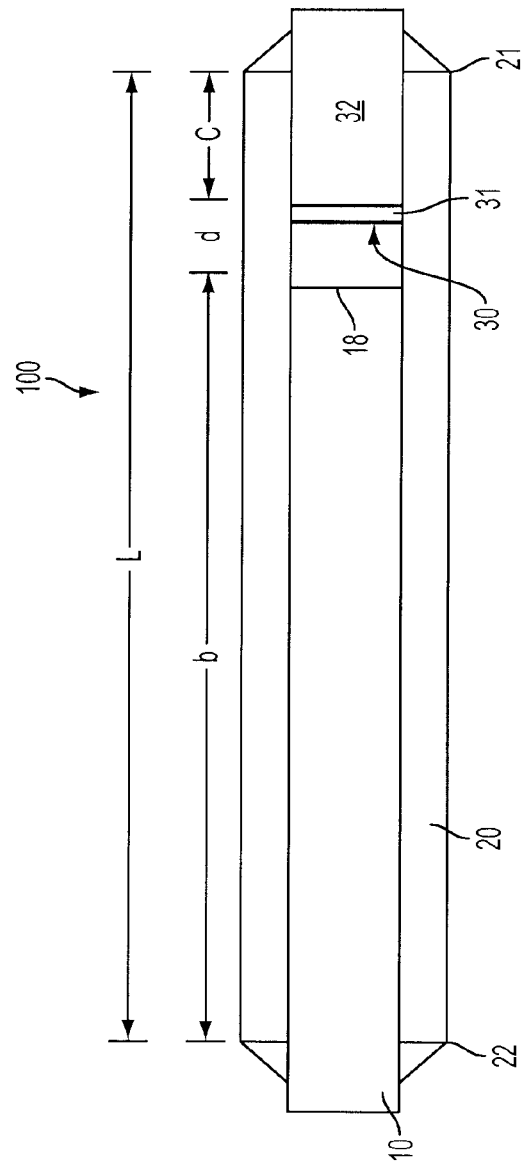
FIG. 1B is a cross sectional view of a exemplary embodiment of a fiber optic strain sensor.

FIG. 1A and FIG. 1B illustrate an example of a fiber optic strain sensor 100 in accordance with an embodiment of the invention.

The sensor 100 includes a fiber probe and a reflective surface. In this embodiment, the fiber probe is a bundle 10 of seven optical fibers is arranged with a transmitting fiber 11 in the center, surrounded by six receiving fibers 12-17. In an exemplary embodiment, the optical fibers 10-17 are multimode fibers with a core and cladding. If the optical fibers have a coating, most or all of the coating can be removed from the outside surface of the cladding.

The fiber bundle 10 is located in a housing 20. In this embodiment, the housing 20 is a cylindrical tube with an inner diameter slightly larger than the outer diameter of the fiber bundle. A reflective surface 30 is spaced apart from the ends of the fiber bundle 10 to reflect light that is transmitted by the central fiber 11 back toward the receiving fibers 12-17.

The fiber probe 10 and the reflector body 32 are affixed to the housing only at the far ends 21, 22 of the housing.

FIGS. 2A, 2B, and 2C show the sensor 100 in operation. The housing 20 is affixed to the material to be tested 33 with an adhesive 34. As the surrounding material 40 lengthens or shortens in the x direction, the adhesion between the tube 20 and the material causes the tube to have a corresponding change in length L. The fiber probe 10 and the aluminum rod reflector 32 are affixed to the stainless steel tube 20 only at the ends of the tube 20. Therefore, the change in length of the tube 20 is not communicated to the fiber probe 10 and to the rod 32. This allows the length of the tube to change while the lengths of the fiber probe 10 and the rod 32 remain the same. As the length of the tube 20 changes, the probe-mirror distance d will increase or decrease. As the probe-mirror distance d changes, the amount of light received in the receiving fibers 12-17 changes. A photodetector 55 receives the light from the receiving fibers, and converts the light into electrical signal. By evaluating the voltage output at the photodetector, the strain in the material 33 can be determined.

Note that the sensor 100 does not rely on interferometry or other coherent optical techniques to characterize the strain. Any broadband or narrowband light source may be used.

In the exemplary embodiment of FIGS. 1A-1B, the optical fibers 11-17 are multimode optical fibers having a core diameter of about 200 microns, and a numerical aperture of about 0.37. The fiber bundle has an outer diameter of about 1.27 millimeters. In this embodiment, the tube is stainless steel, has an inner diameter of about 1.37 millimeters, and an outer diameter of about 1.83 millimeters. The length of the tube is approximately 1.02 cm length, which is also the length of the strain sensor. The outer diameter of the aluminum cylinder 32 is approximately 1.27 millimeters.

In this embodiment, the reflective surface 30 is a reflective mylar film with an aluminum deposition 31, and the film is adhered to a polished end of an aluminum cylinder 32. The aluminum cylinder 32 has an outer diameter slightly less than the inner diameter of the tube 20. The reflective surface 30 has a very high reflectivity for optical wavelengths carried by the optical fibers.

To form the sensor 100, the aluminum cylinder 32 is polished at one end and a reflecting mylar film is glued at the end surface of the cylinder 32. The aluminum cylinder is inserted in the stainless steel tubing 20 a distance from the end of the tube 20 and is glued in place at the end 21 of the tube 20 with a strong adhesive. Here, the distance c from the end of the tube to the inserted end of the aluminum cylinder is about 4 millimeters. The fiber probe 10 is inserted into the opposite end of the tube. As explained in later paragraphs, one method for positioning the fiber probe 10 is to monitor the detected light from the six receiving fibers while inserting the fiber probe into the tube. When in position, the fiber bundle 10 is adhered to the end of the tube 20. The overall length of the tube is L, which in this embodiment is about 1.04 cm.

Suitable adhesives for affixing the rod 32 and fiber probe 10 to the tube 20 include, but are not limited to, cyanoacrylate adhesive, available under the tradenames "SUPERGLUE" or "CRAZYGLUE". Adhesives can also be cellulosic, phenolic, epoxy, or other types.

These adhesives can also be used to affix the housing to the material to be tested. Preferably, the adhesive 34 coats the entire surface between the housing 20 and the material 33. The adhesive should be flexible enough to avoid cracking under tensile and compressive loads along the length of the sensor.

In this embodiment, adhesive is applied at the ends 21 of the tube 20 so the entire circumferences of the fiber probe and the reflector body 30 are adhered to the tube. However, the invention also includes embodiments in which only a portion of the circumference of the fiber probe and reflector body are adhered to the tube 20. Moreover, the fiber probe and reflector body can be affixed to the tube 20 by other mechanical or chemical means. Further, the shape of the housing is not limited to a cylinder. The housing can be any desirable shape. Embodiments of the invention can also include a housing that has openings in its length, or that does not entirely surround the fiber probe and reflector body. As one example, the housing can be a U or C shape which surrounds and holds the fiber probe and reflector body in alignment, with one side of the U or C adhered to the material whose strain is to be measured.

It is also envisioned that the fiber probe 10 and the reflector body 32 can be affixed to the housing 20 at points that are not precisely at the far ends of the housing tube 20. For example, it may be desirable to have a portion of the housing extend beyond one or both of the adhesion points, for manufacturing, handling, or other design or convenience purposes. In such embodiments, the sensor length L is considered to be the distance between adhesion points between the housing 20 and the fiber probe 10, and the housing and the reflector body 32, respectively.

As also shown in FIG. 2A, the light source for the sensor is a light emitting diode (LED). Other suitable light sources include lasers, or incandescent or other light bulb sources, although each has disadvantages. Lasers are more expensive and complex than LEDs, and light bulbs provide less light, so are less sensitive and have a shorter range than LEDs.

In an exemplary embodiment, the optical fiber 52 extends between the LED 54 and the coupler 50 is a multimode fiber with a diameter about the same diameter of the transmitting fiber 11 in the sensor 100. The polished far ends of the six receiving fibers 12-17 in the sensor abut a larger diameter multimode optical fiber. As seen in FIG. 2B, the six receiving fibers transmit the received light into the larger diameter multimode optical fiber 53, which transmits the received light to the photodetector. In this embodiment, the multimode optical fiber 53 has a core diameter of about 600 microns. Other fibers having a core diameter sufficiently large to receive the majority of the light from the receiving fibers 12-17 can be used.

The fiber bundle of the strain sensor can have fewer or more than seven fibers. As an example, FIG. 3 illustrates an embodiment of a strain sensor 300 in which the fiber bundle 60 includes one transmitting fiber 61 and one receiving fiber 62.

Figure 4A:
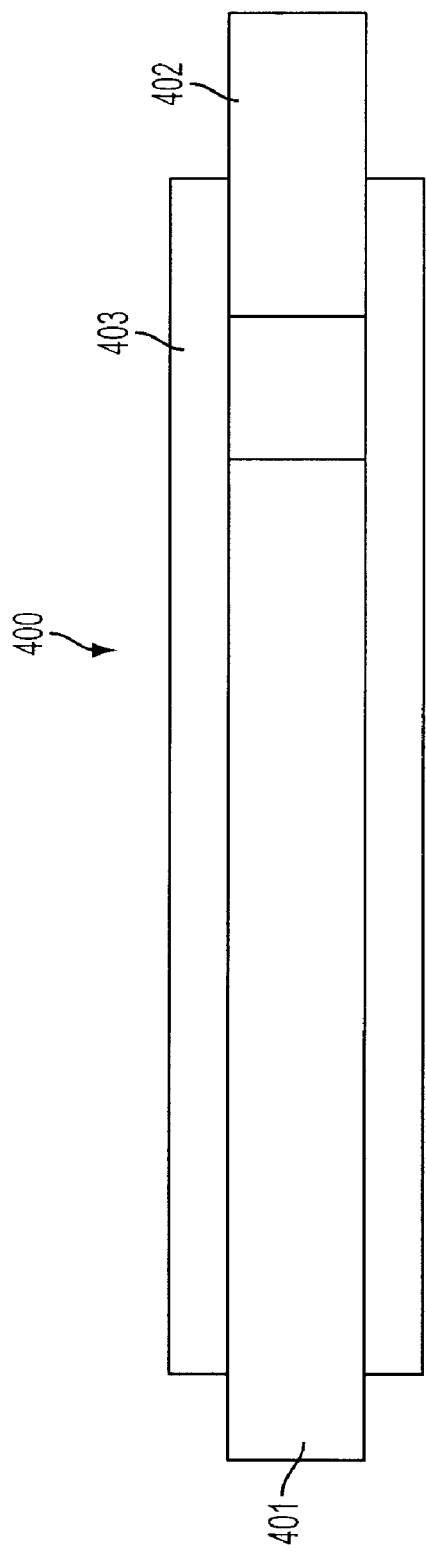
FIGS. 4A and 4B illustrate another embodiment of a strain sensor having a single fiber for both transmitting and receiving.
Figure 4B:
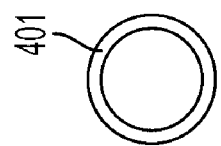

FIGS. 4A and 4B illustrate another embodiment of a strain sensor 400, in which the sensor has a single fiber 401. The light reflected by the reflector 402 is coupled back into the same fiber, and transmitted to a photodetector. In this embodiment, the optical fiber 401 is a multimode fiber with a 100 micron glass core radius, a 230 micron diameter plastic clad (HCS, Spectran Specialty Optics), a 500 micron diameter Tefzel coating, and a 0.37 numerical aperture. The light source is a Optek OPF370A LED emitting light at 850 nanometer wavelength, and the detector is a silicon PIN. A coupler is arranged to direct the reflected light to the photodetector. The coupler can be a 50/50 (at 850 nm wavelength), low loss, fiber coupler available commercially from Gould Electronics. The one-fiber probe has a tubular housing that has a 902 micron outer diameter and a 584 micron inner diameter.

Without wishing to limit the invention to any particular theory of operation, the following discussion is provided regarding a theoretical basis for the strain sensor results discussed herein.

Figure 5:
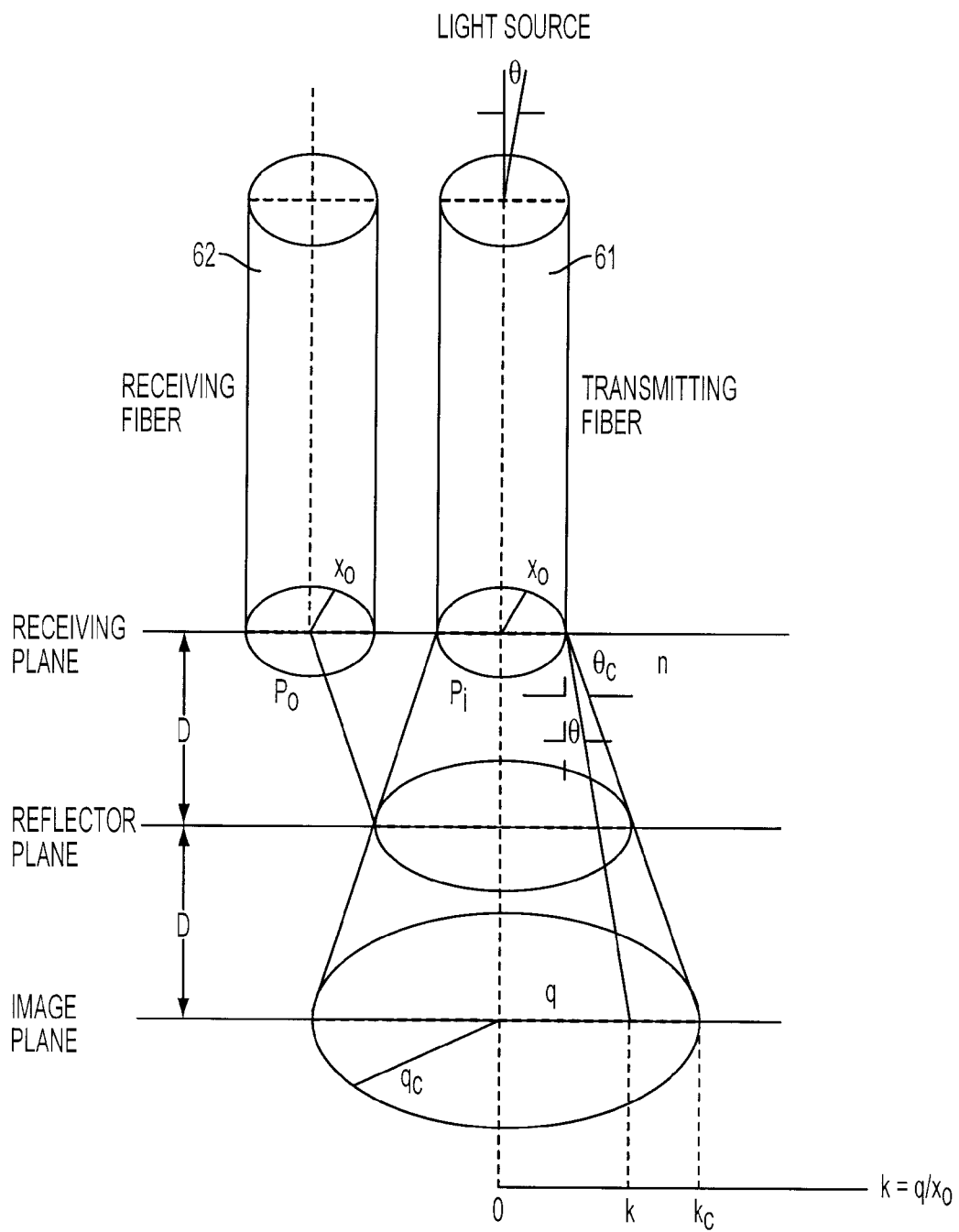
FIG. 5 illustrates the receiving plane, image plane, and reflector plane for a fiber probe for use in a strain sensor according to the invention.

By referring to FIG. 5, the light source illuminating the transmitting fiber will contain beams arriving from all angles $\theta$ with respect to the fiber axis. The rays with an angle $\theta \leq \theta_c$ will couple into the fiber. The critical angle $\theta_c = \sin^{-1}$ (NA/n) is the cutoff angle determined by the fiber numerical aperture NA and the refractive index n of the surrounding medium. Similarly, the light rays exiting the fiber sensing end will form a cone with a maximum angle $\theta_c$. The beam in the direction between $\theta$ and $\theta_c$ is defined as a uniangular beam for $0 \leq \theta \leq \theta_c$ and the reflected intensity on the receiving plane is equivalent to that on the image plane. Assume equal power illumination from uniangular beams, such that the incident light rays coming from different $\theta$ directions couple the same amount of optical power into the fiber core area based on an insignificant change of this power within a small acceptance angle.

In terms of the transmitting fiber core radius Xo define K=Q/Xo as a dimensionless coordinate on the image plane. The boundary of the illuminated area is Kc, defined as Kc=(Qc/Xo)=1+(2D tan ($\theta_c$)/Xo), where K and $\theta$ are related by $\theta = \tan^{-1}[(K-1)Xo/2d]$. Define Pi as the total optical power exiting the transmitting fiber and Po' as the power reflected back into the receiving fiber.

In the case of the 7 fiber probe of FIGS. 1A and 1B, the power collected by the 6 receiving fibers will be Po=6 Po'.

The normalized received power in one receiving fiber Po'/Pi is given as $$Po'/Pi = (2/\pi) \int_{m-1}^{b} I'_k \sigma k dk.$$

In this equation, $\sigma = \cos^{-1}[(k^2+m^2-1)/2\ km]$, $m=2+2\ Cm/Xo$, Cm is the cladding thickness, $I_k = I_k/I_0$ is the dimensionless intensity, Io is the total light intensity at the transmitting fiber probe end, and b=Kc if Kc$\leq$m+1, b=m+1 if Kc>m+1.

In terms of these parameters, FIG. 5, and the FIG. 3 and $A=x_0/(2D)$, $I_k$ is:

(a) for $1 \leq k_c < 2$ and $0 \leq k \leq 2-k_c$:

$I_k = (AI_0/((1-A^2)\theta_c))[\tan^{-1}(k_c-1) - A\tan^{-1}[A(k_c-1)]]$ (b) for $1 \leq k_c < 2$ and $2-k_c < k \leq 1$:

$$I_k = (AI_0/(2\theta_c(1-A^2)))[\tan^{-1}(k_c-1)-A\tan^{-1}[A(k_c-1)]+\tan^{-1}(1-k)-A\tan^{-1}[A(1-k)]]$$

(c) for $k_c \geq 2$, $0 \leq k < 1$, and $k_c-k \leq 2$:

$$I_k = (AI_0/(2\theta_c(1-A^2)))[(\pi/4)-A\tan^{-1}A+\tan^{-1}(1-k)-A\tan^{-1}[A(1-k)]]+(AI_0/(8\theta_c))\ln[(k_c-1)^2(1+A^2)/[1+A^2(k_c-1)^2]]$$

(d) for $k_c \geq 2$, $0 \leq k < 1$, and $k_c-k > 2$:

$$I_k = (AI_0/(2\theta_c(1-A^2)))[(\pi/4)-A\tan^{-1}A+\tan^{-1}(1-k)-A\tan^{-1}[A(1-k)]]+(AI_0/(8\theta_c))\ln[(k+1)^2(1+A^2)/[1+A^2(k+1)^2]]$$

(e) for $1 \leq k_c \leq 2$ and $1 \leq k \leq k_c$:

$$I_k = (AI_0/(2\theta_c(1-A^2)))[\tan^{-1}(k_c-1)-\tan^{-1}(k-1)+A\tan^{-1}[A(k-1)]-A\tan^{-1}[A(k_c-1)]]$$

(f) when $k_c > 2$, $1 \leq k \leq 2$, and $k_c-k \leq 2$:

$$I_k = (AI_0/(2\theta_c(1-A^2)))[(\pi/4)-A\tan^{-1}A-\tan^{-1}(k-1)+A\tan^{-1}[A(k-1)]]+(AI_0/(8\theta_c))\ln[(k_c-1)^2(1+A^2)/[1+A^2(k_c-1)^2]]$$

(g) when $k_c > 2$, $1 \leq k \leq 2$, and $k_c-k > 2$:

$$I_k = (AI_0/(2\theta_c(1-A^2)))[(\pi/4)-A\tan^{-1}A-\tan^{-1}(k-1)+A\tan^{-1}[A(k-1)]]+(AI_0/(8\theta_c))\ln[(k+1)^2(1+A^2)/[1+A^2(k_c-1)^2]]$$

(h) when $k_c > 2$, $k > 2$, and $k_c-k \leq 2$:

$$I_k = (AI_0/(8\theta_c))\ln[[(k_c-1)^2(1+A^2(k-1)^2)]/[(k-1)^2(1+A^2(k_c-1)^2)]]$$

(i) when $k > 2$, $k > 2$, and $k_c-k > 2$:

$$I_k = (AI_0/(8\theta_c))\ln[[(k+1)^2(1+A^2(k-1)^2)]/[(k-1)^2(1+A^2(k_c-1)^2)]]$$

The intensity $I_k$ and normalized light power Po/Pi collected by the six receiving fibers of the FIG. 1 strain sensor can be calculated using these equations.

Figure 6:
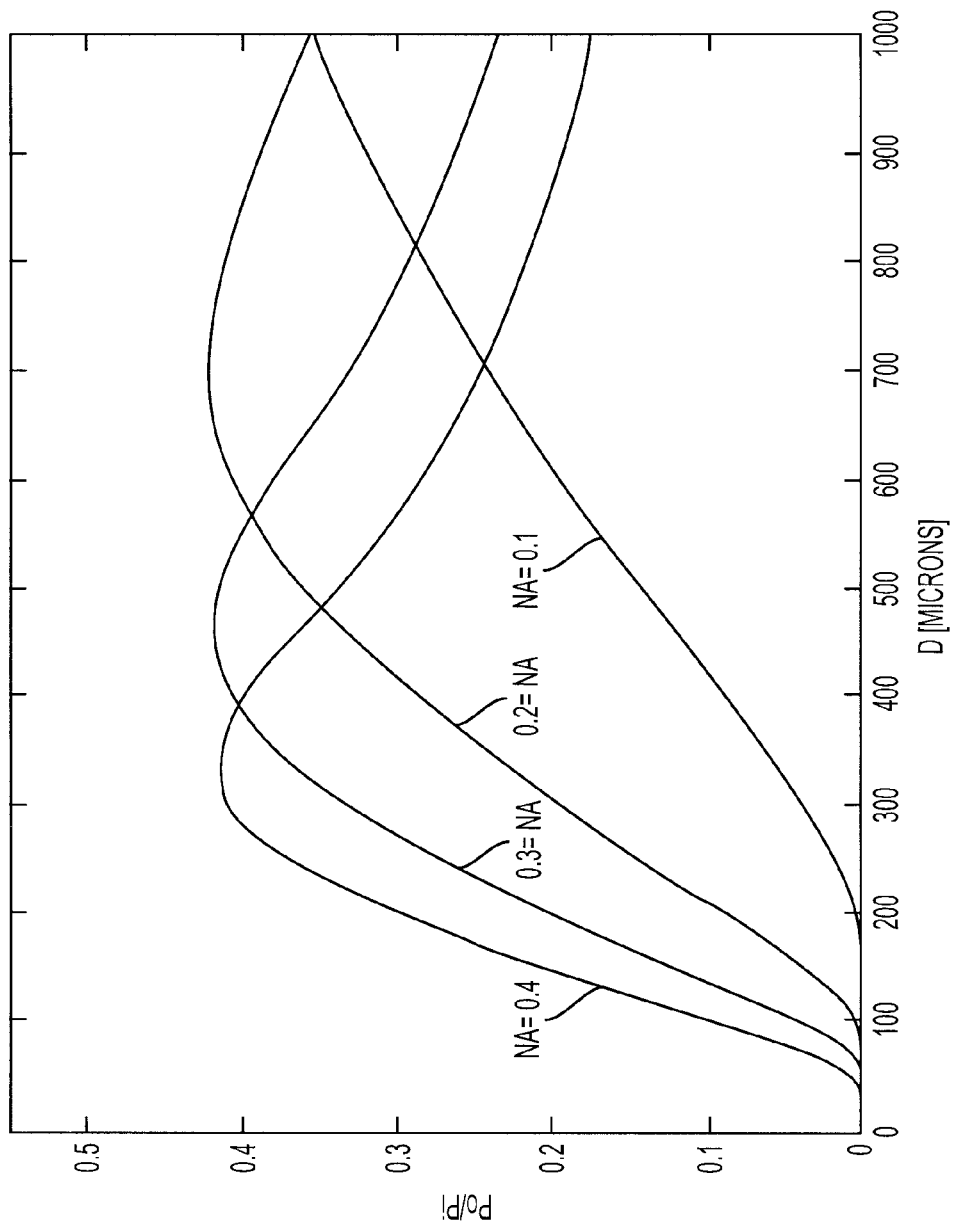
FIG. 6 shows the normalized light power Po/Pi collected by the six receiving fibers as a function of the distance D between the fiber probe end and the reflector for several different values of the fiber's numerical aperture.

FIG. 6 shows the normalized light power Po/Pi collected by the six receiving fibers as a function of the fiber probe end distance from the reflecting surface D for different numerical apertures. In this example, the transmitting and receiving fibers have 100 μm core radius and a 15 μm cladding thickness, and the refractive index of the surrounding medium (air) is 1. At very small probe-reflector distances, very little light is coupled into the receiving fibers. In this case most of the light is coupled back into the transmitting fiber. As the distance increases the light detected power increases very quickly, reaches a peak, and then starts decreasing. The region of the fastest increase results in the highest displacement sensitivity and is a strong function of the fiber numerical aperture. By comparing the slope of the curves in FIG. 6, it is seen that as the fiber numerical aperture increases higher sensitivity is obtained.

Figure 7:
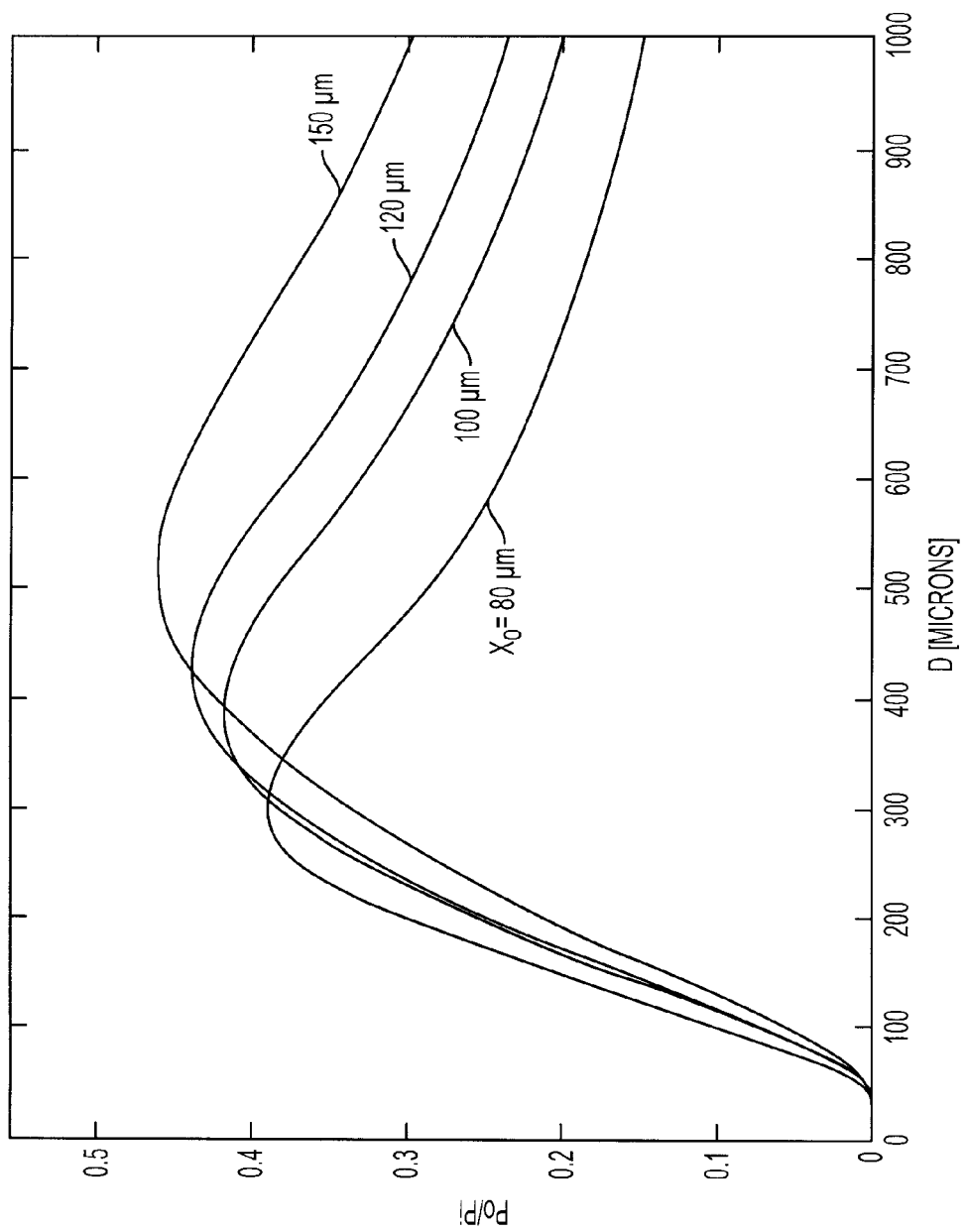
FIG. 7 shows the normalized light power Po/Pi collected by the six receiving fibers as a function of the distance D between the fiber probe end and the reflector for several different values of the fiber core radius Xo.

FIG. 7 shows the normalized light power Po/Pi collected by the six receiving fibers as a function of fiber probe end distance D for several different values of the fiber core radius Xo. As can be seen from this figure, the region of maximum collected power change does not change very much with the fiber core radius. However, since the LED light power coupled into the transmitting fiber increases as the square of the fiber core radius and the sensor signal to noise ratio increases as the square root of the detected light power, the displacement sensitivity has a strong dependence on the fiber core radius.

Figure 8:
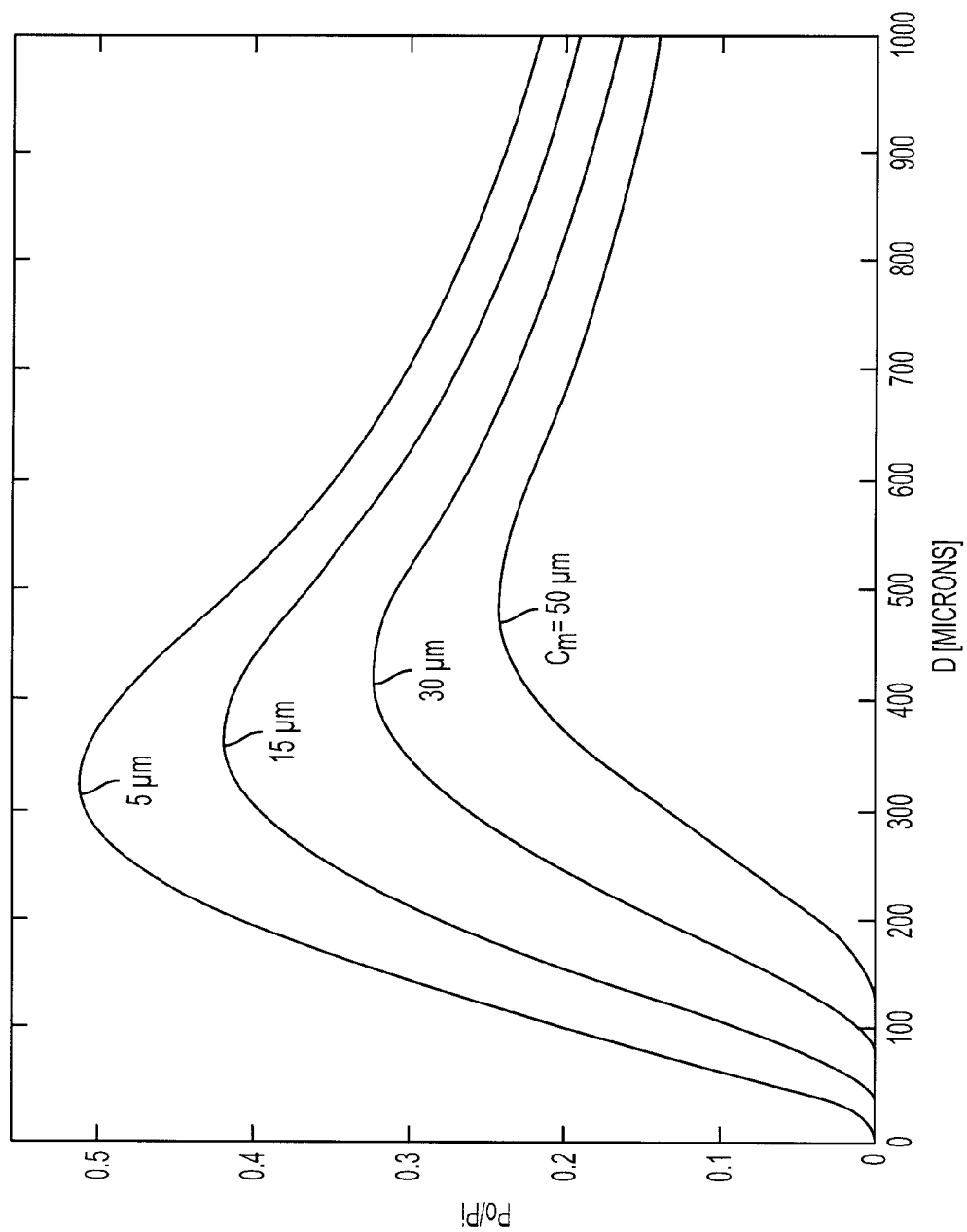
FIG. 8 shows the normalized detected power Po/Pi as a function of the distance D between the fiber probe end and the reflector for several cladding thickness Cm.

FIG. 8 shows the normalized detected power Po/Pi as a function of the probe-reflector distance D for several cladding thickness Cm. The maximum point of the Po/Pi curve increases rapidly as the cladding thickness decreases. This is expected since fibers with small cladding thickness can be packed better than larger cladding thickness fibers.

Figure 9:
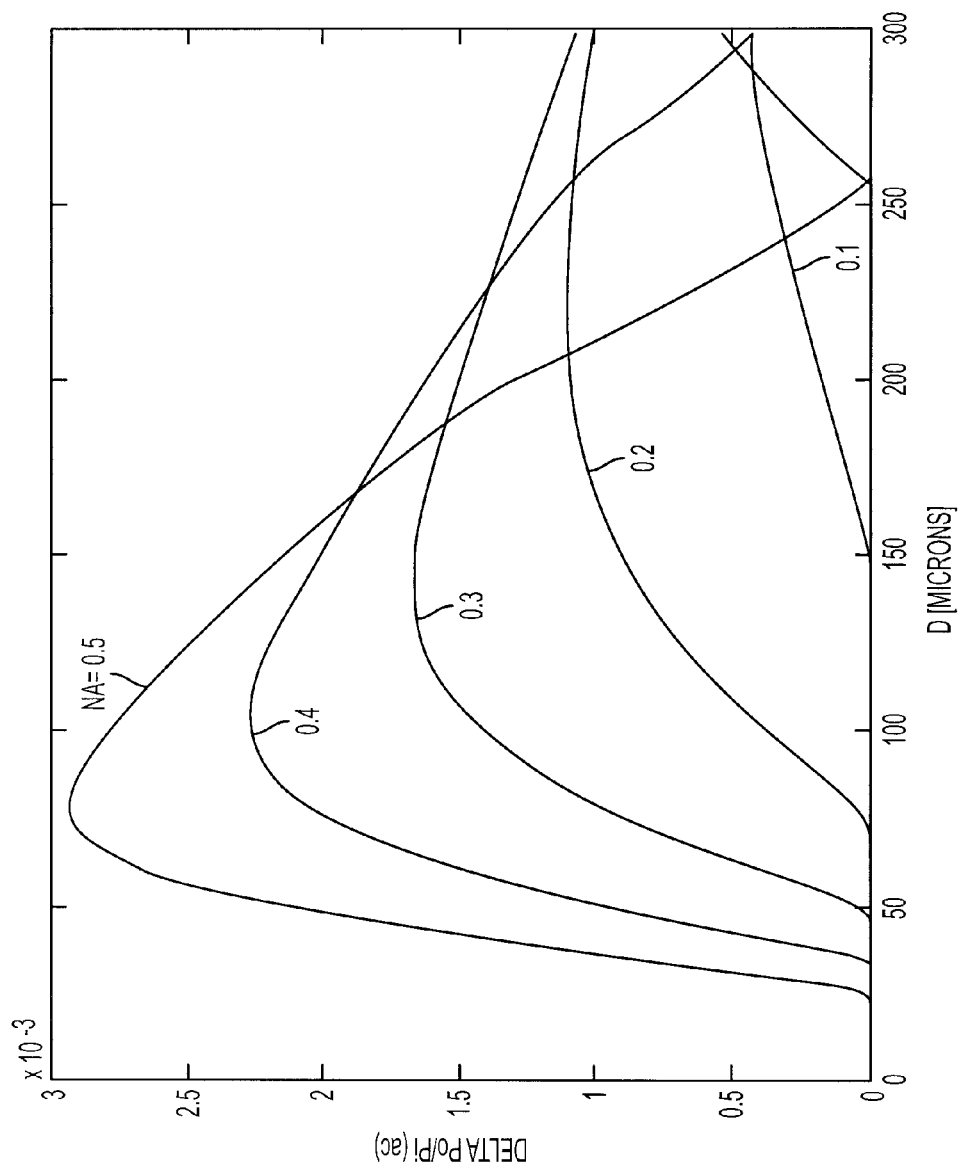
FIGS. 9, 10, and 11 illustrate the fiber probe displacement sensitivity as a function of D for several different values of numerical aperture NA, fiber core radius Xo, and cladding thickness Cm.
Figure 10:
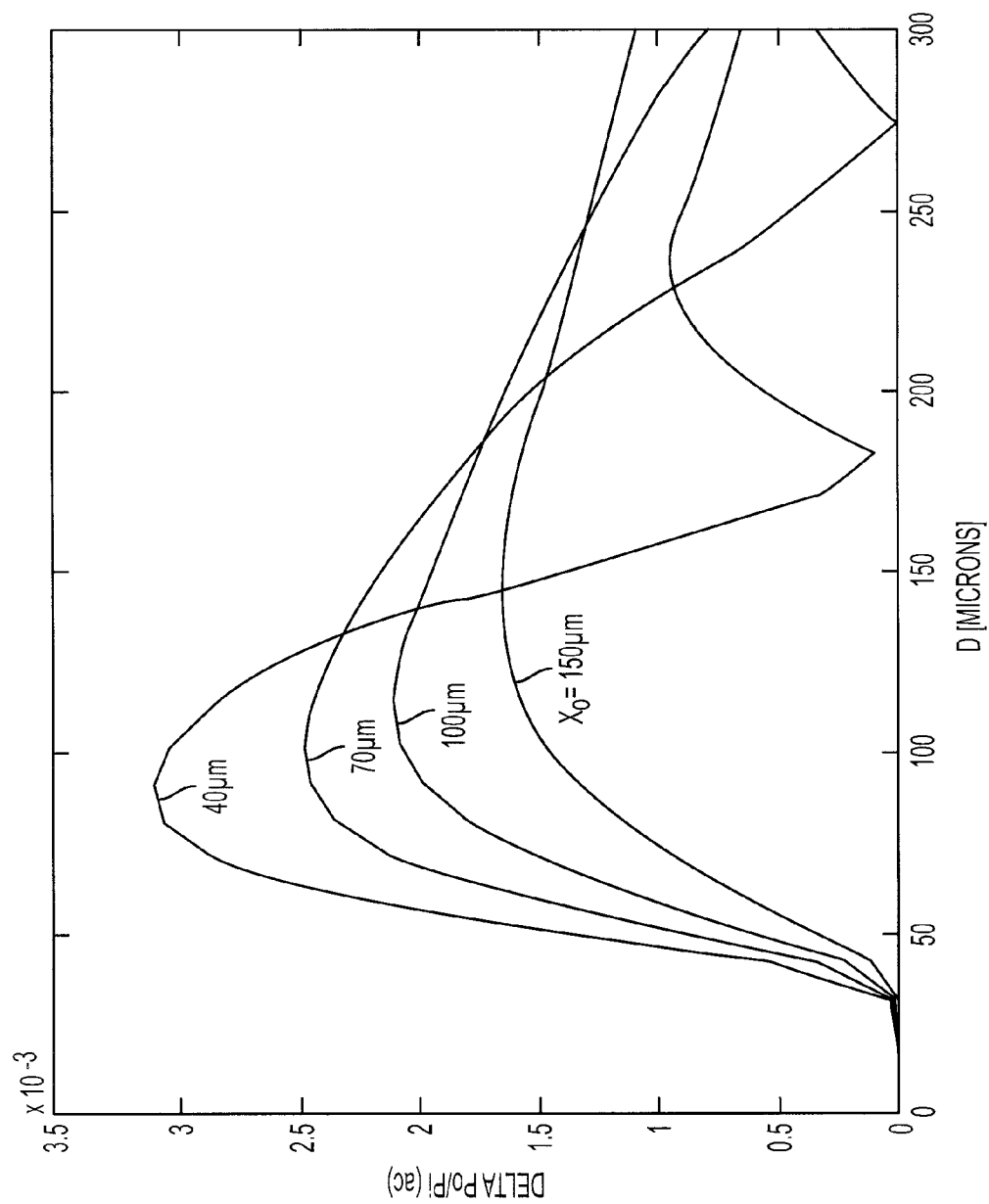
Figure 11:
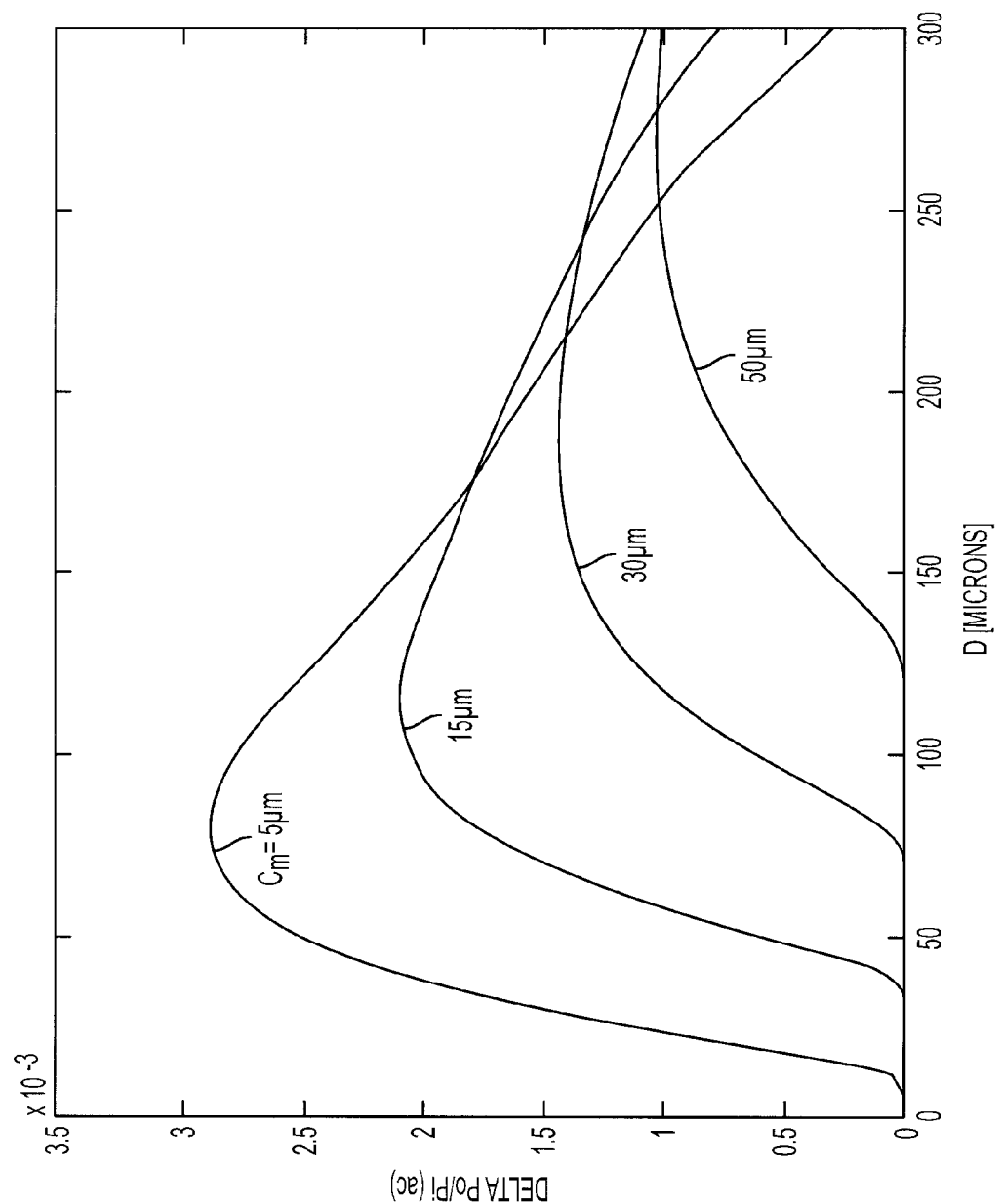

FIGS. 9, 10, and 11 illustrate the fiber probe displacement sensitivity as a function of D for several different values of numerical aperture NA, fiber core radius Xo, and cladding thickness Cm. The fiber probe displacement sensitivity is calculated as the derivative of the normalized detected power Po/Pi. In these figures, the maximum displacement sensitivity is at the peak of the plots. Note that as the displacement sensitivity increases, the region of the highest sensitivity becomes sharper, which, in turn, decreases the sensor dynamic range. In FIGS. 9, 10, and 11, the sensitivity is evaluated in the area of the curve to the left of the first maximum.

As can be seen from FIG. 9, the sensitivity increases significantly as the fiber numerical aperture increases. Fibers with high numerical aperture are also preferred since they can couple higher LED light power. Another important parameter is the fiber core radius. As can be seen from FIG. 10, the displacement sensitivity increases as the fiber core radius Xo decreases. The reason for this is that in these calculations the total light power was kept the same, which increases the light power density in the fiber core. Such a light power density increase can be achieved only with another LED or a laser diode. FIG. 11 illustrates that the displacement sensitivity increases as the fiber cladding thickness Cm decreases.

In this section, analytical predictions for performance of one-fiber and seven-fiber probes are compared with test results of one-fiber and seven-fiber probes of FIG. 4 and FIG. 1.

Figure 12:
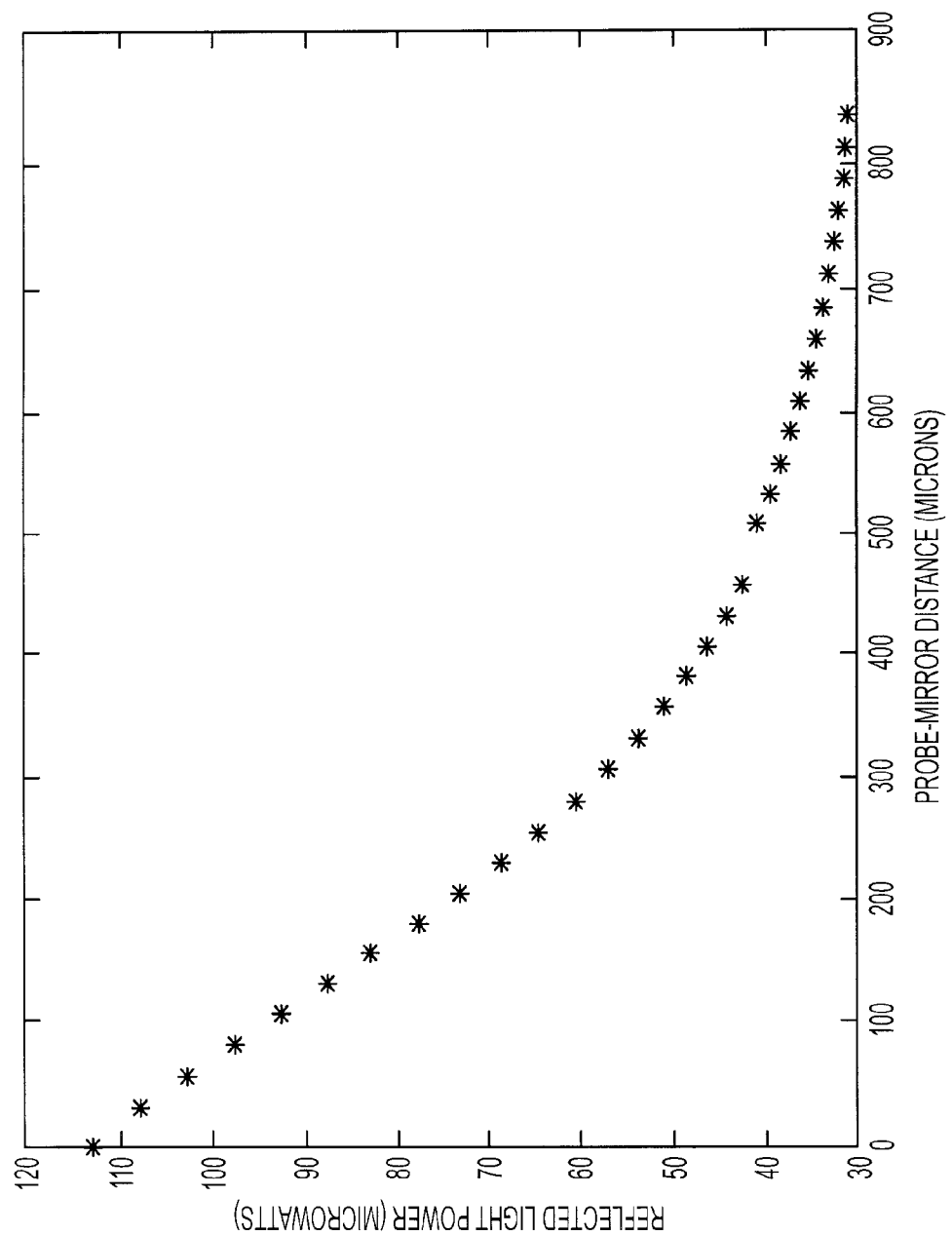
FIGS. 12 and 13 illustrate test results for a one-fiber strain sensor shown in FIGS. 4A and 4B.
Figure 13:
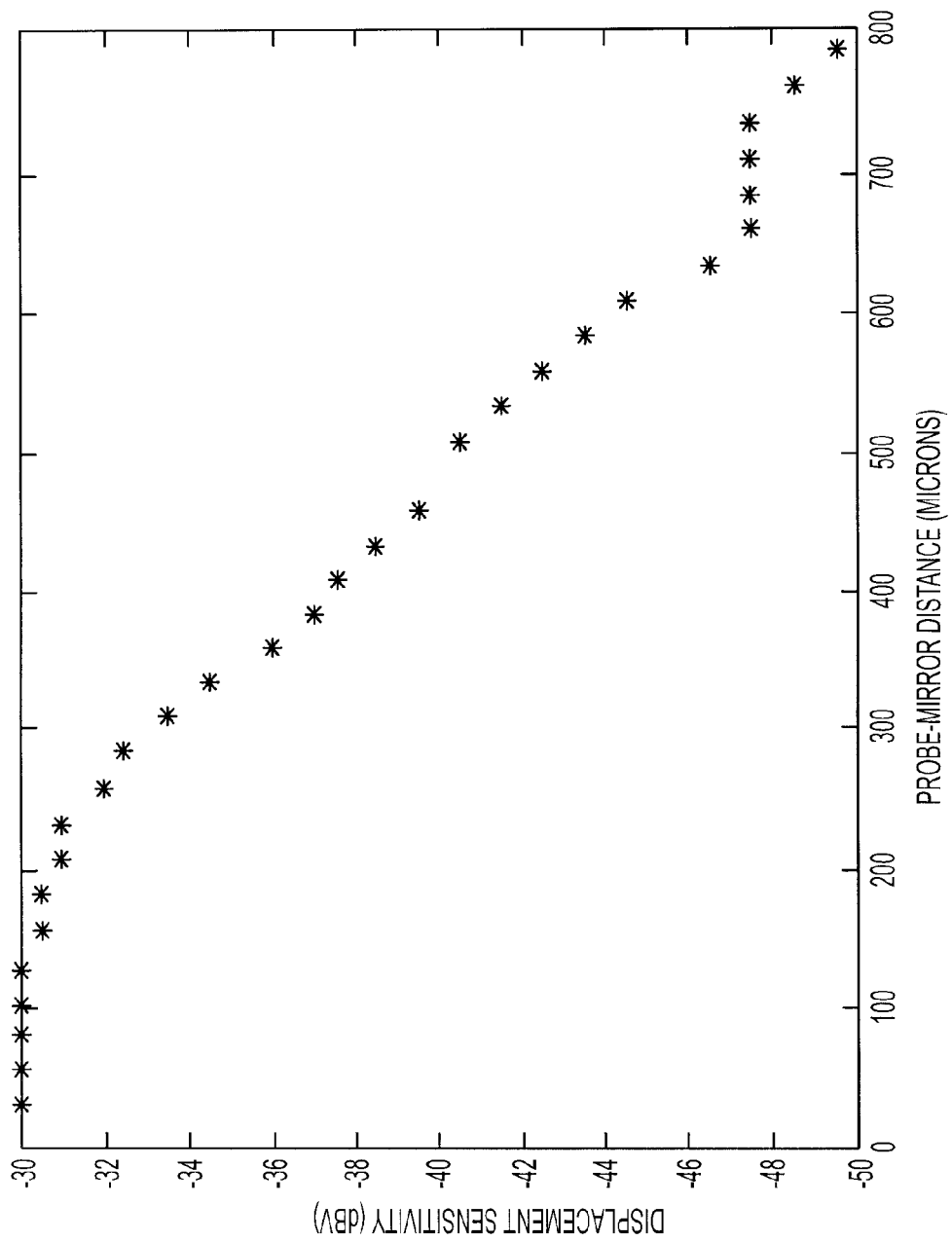

FIGS. 12 and 13 illustrate test results for a one-fiber strain sensor shown in FIGS. 4A and 4B. The strain sensor used in the sensor uses a multimode fiber with a 100 micron glass core radius, a 230 micron diameter plastic clad (HCS, Spectran Specialty Optics), a 500 micron diameter Tefzel coating, and a 0.37 numerical aperture. The strain sensor's fiber probe has a stainless steel housing that has a 902 micron outer diameter and a 584 micron inner diameter. The light source is a Optek OPF370A LED emitting light at 850 nanometer wavelength, and the detector is a silicon PIN. A coupler is arranged to direct the reflected light to the photodetector. The coupler can be a 50/50 (at 850 nm wavelength), low loss, fiber coupler available commercially from Gould Electronics.

The one fiber probe of the strain sensor is mounted on a micrometer translator that is manually displaced against a mirror mounted on a piezoelectric transducer. The micrometer translator can be displaced manually against a mirror mounted on the piezoelectric transducer 60 (PZT-4 cylinder of 2" o.d and 3" length) which could be vibrated electrically. The one-fiber probe displacement sensitivity is obtained by displacing manually the probe against the mirror in of 25.4 micron increments using the micrometer translator. The results of this experiment are shown in FIG. 12, in which the reflected light coupled into the same fiber is plotted vs. the probe-mirror distance D. As can be seen from this figure, maximum displacement sensitivity is achieved in the 0-150 micron probe-mirror distance.

The one-fiber probe is then dynamically displaced against the mirror by vibrating the PZT transducer electrically. The displacement amplitude of the vibrating mirror is obtained from the output of a small reference accelerometer mounted close to the mirror. In this set-up, the reference accelerometer is an Endevco 2250A model, but other accelerometers can be used. FIG. 13 illustrates the results of this experiment. In FIG. 13, the ac displacement sensitivity is shown as a function of the probe-mirror distance. As can be seen from this figure, the sensitivity is maximum and approximately constant in the 0-150 micron region, in good agreement with the dc displacement results of FIG. 12. FIGS. 12 and 13 show that for this one-fiber probe, an optimum distance D between the reflecting surface and the end of the fiber probe is about 60 microns and an optimum operating region is between 0 and about 120 microns. This strain sensor can be operated outside this range, however, the reflected light and the sensitivity will be less than in the 0-120 micron range.

Figure 14:
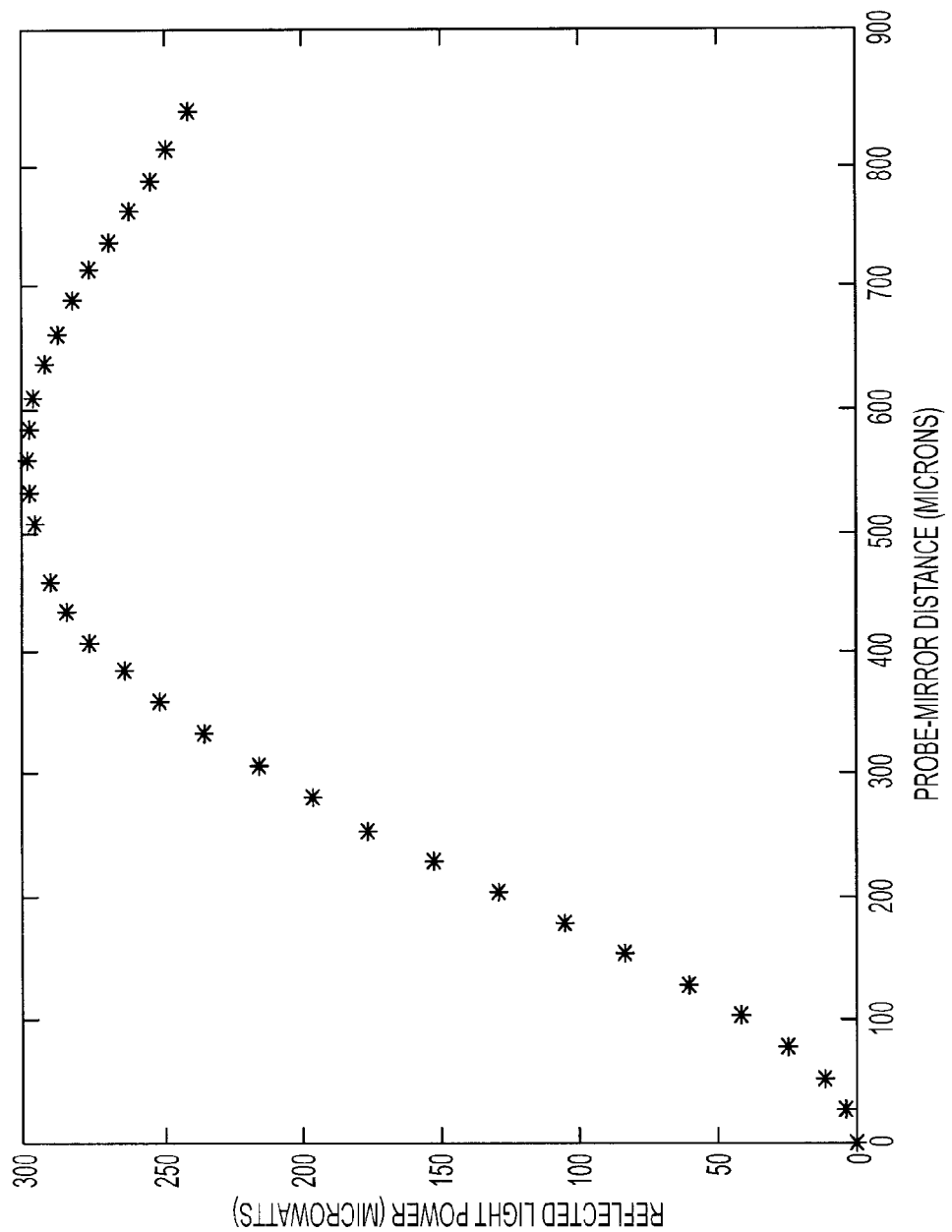
FIGS. 14 and 15 illustrate test results for the seven-fiber fiber optic strain sensor of FIG. 1.
Figure 15:
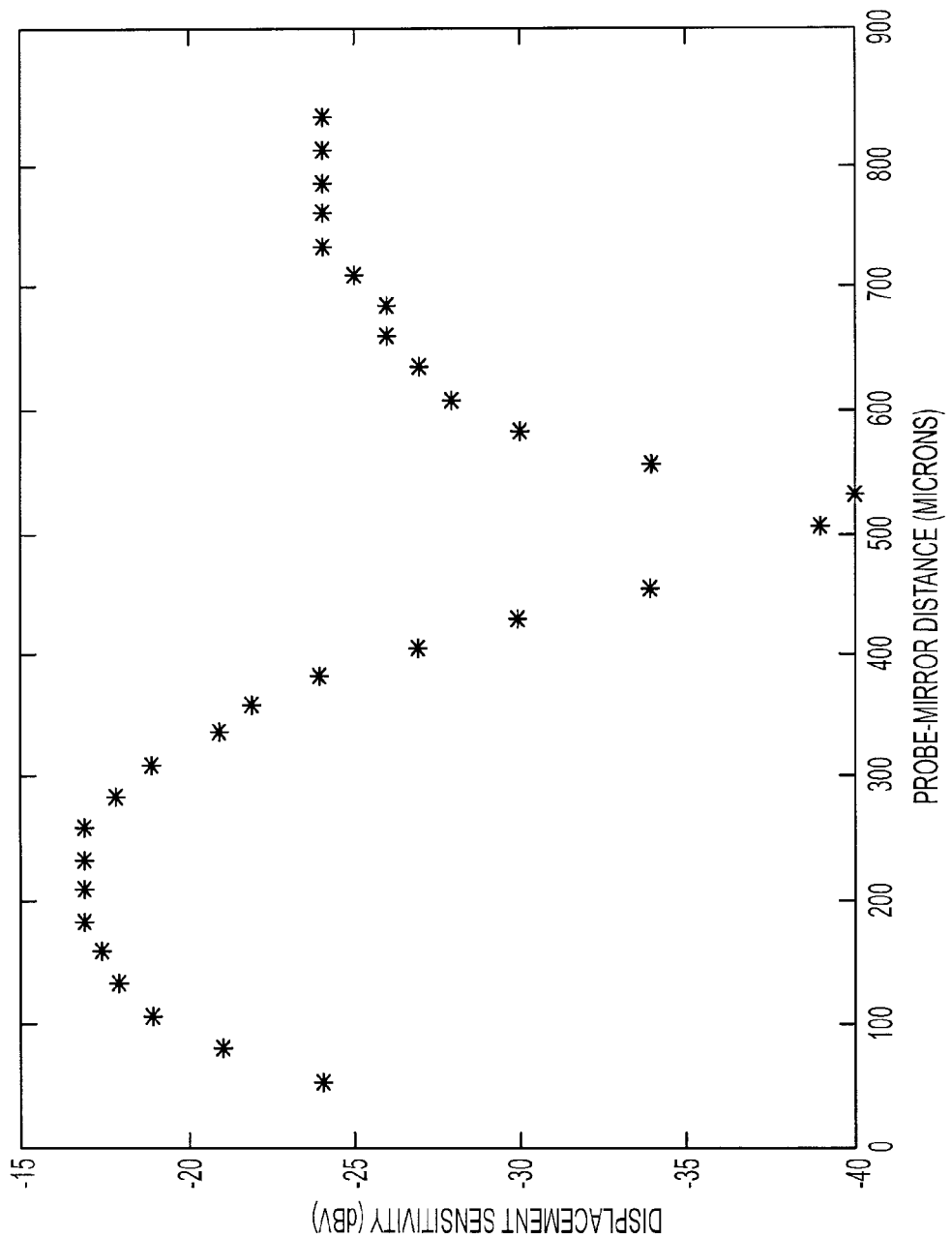

Experimental performance of the seven-fiber fiber optic strain sensor of FIG. 1 is shown in FIGS. 14 and 15. For the seven fiber probe of FIG. 1, the coating is stripped from the optical fibers using a stripper having a 305 micron diameter blade hole and the fibers are inserted in a stainless steel tubing (1.270 mm outer diameter and 838 micron inner diameter. Epoxy is applied on the 7 fibers, and the fibers are forced into a symmetric bundle close to the tubing end with the transmitting fiber at the center of the bundle. After the epoxy is cured, the fiber bundle is cut closely to the tubing end and the fiber probe is polished very well.

The seven fiber probe displacement sensitivity is obtained by displacing manually the probe against the mirror in of 25.4 micron increments using the micrometer translator. The dc displacement sensitivity of this seven fiber probe is shown in FIG. 14, which plots the reflected light power coupled into the 6 receiving fibers versus the probe-mirror distance. The maximum displacement sensitivity is achieved for a fiber end to reflector distance in the range of about 180 to about 250 microns. In this range, the dc displacement sensitivity is $9.38 \times 10^{-11}$ Watts per Angstrom.

Note that the maximum sensitivity region of the seven-fiber probe of FIG. 1 is different from that of the 1 fiber probe of FIG. 4 where it starts from zero distance. Another important difference is that with the seven-fiber probe, significantly higher light power is detected. This is believed to be due primarily to the coupler used in the 1 fiber probe, which reduces the light power by at least 50%.

The seven-fiber probe is dynamically displaced against the mirror by vibrating the PZT transducer electrically. The displacement amplitude of the vibrating mirror is obtained from the output of a small reference accelerometer mounted close to the mirror. In this set-up, the reference accelerometer is an Endevco 2250A model, but other accelerometers can be used. FIG. 15 plots the resulting ac displacement sensitivity as a function of the probe-mirror distance. As can be seen from this figure, maximum displacement sensitivity is achieved in the probe-mirror distance range of about 180-250 microns. This is in good agreement with the dc displacement results of FIG. 14. Over this range of probe-mirror distances, the sensitivity is approximately constant.

The maximum displacement sensitivity range can be used to select an optimum probe-reflecting surface distance of about 220 microns. Note that the probe-mirror distance can be set outside of the 180-250 micron range, however, the displacement sensitivity will be less. In applications in which a higher reflected light power is more important than sensitivity, the probe mirror distance can be selected to be in the approximately 600 to 800 micron range.

By comparing FIGS. 13 and 15, it can be also seen that the maximum ac displacement sensitivity of the seven-fiber probe is about 13 dB higher than that of the one-fiber probe. The multimode coupler is also an additional expense that is not required for the seven-fiber probe. Therefore, in applications in which low cost and high ac sensitivity is desired, a seven-fiber probe based strain sensor can be a better choice.

The displacement sensitivity of the seven fiber probe can be calculated based on the amount of light received by the PIN photodetector and the reference accelerometer and was found to be $6.35 \times 10^{-11}$ Watts per Angstrom. This displacement sensitivity is slightly less than the sensitivity ($9.38 \times 10^{-11}$ W/A) found from the dc displacement experiment. In general, these results show that the displacement sensitivity is approximately the same across a range from the minimum detectable displacement to the displacements used in the dc experiment (0.1 mm). The dynamic range of the seven-fiber probe is approximately eight orders of magnitude.

The minimum detectable displacement was obtained by using a OPF 370A Optek LED driven at 100 mA current by a LDX-3620 Lightwave Technology power supply used in the battery operated mode. The detector was a TIA-500 Terahertz Technologies Inc. PIN detector, the output of which was stored into a 3582A HP spectrum analyzer. The fiber optic probe signal obtained with a known mirror displacement was compared to the noise which was the signal obtained with the mirror stationary. From that comparison the minimum detectable displacement was found to be 0.1 Angstroms/$(Hz)^{1/2}$ for f<5 kHz, and 0.04 Angstroms/$(Hz)^{1/2}$ for f>5 kHz. This minimum detectable displacement is limited primarily by the noise of the LED and its current source.

Figure 16:
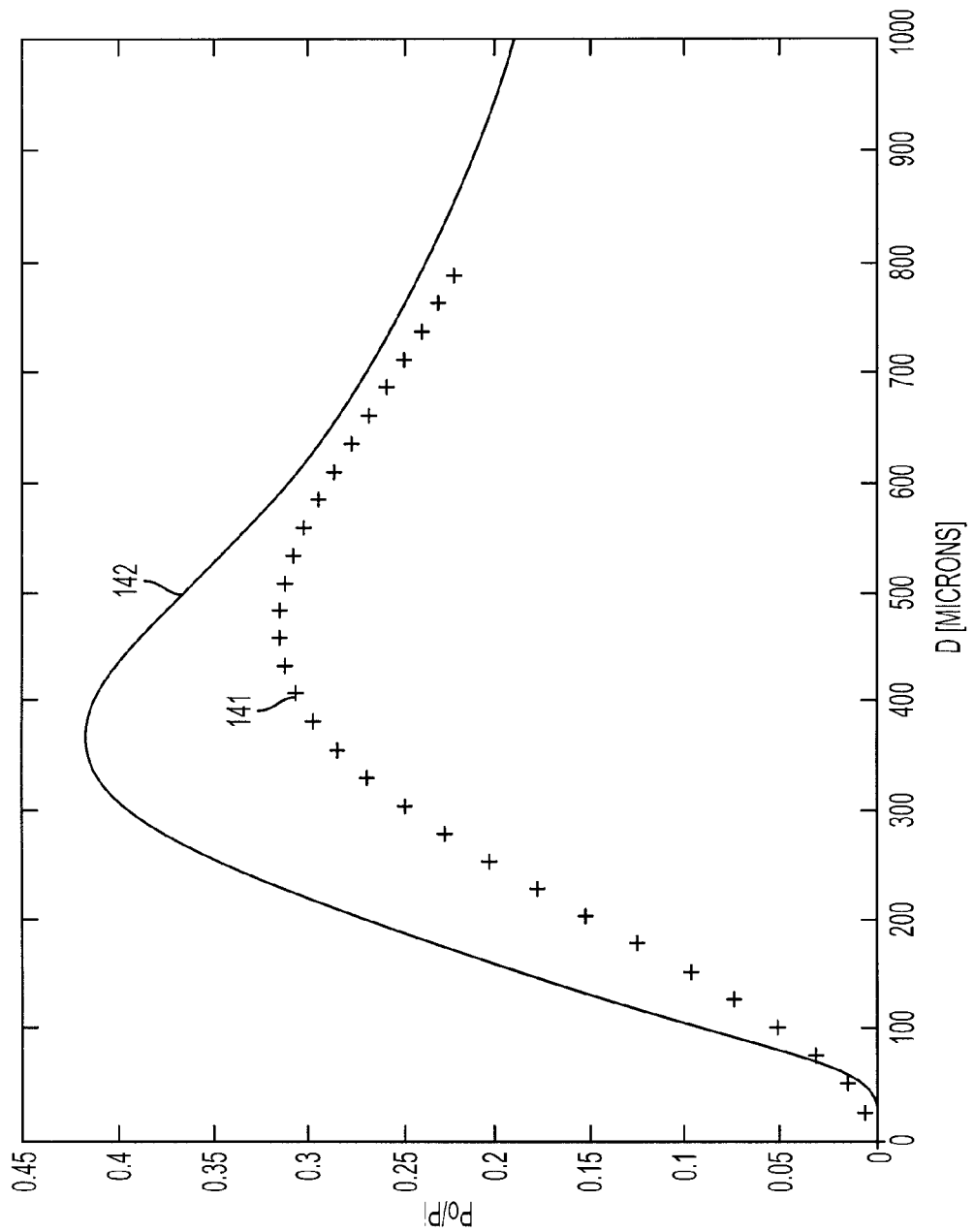
FIG. 16 compares the experimentally obtained displacement response and sensitivity of the seven-fiber probe with the analytical predictions.
Figure 17:
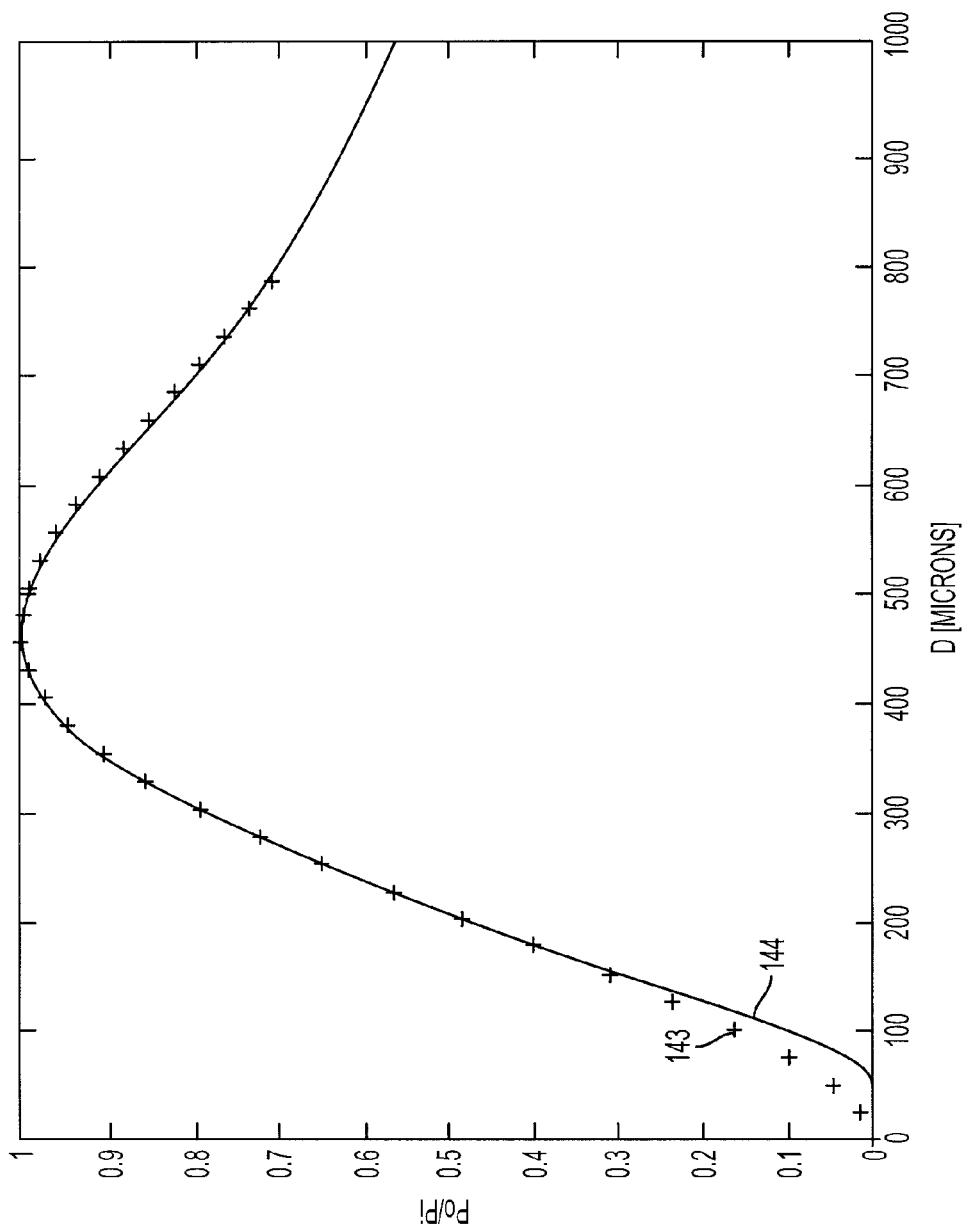
FIG. 17 compares the values of the predicted Po/Pi with the experimental results for the FIG. 1 fiber optic strain sensor.

FIG. 16 plots both the experimentally obtained displacement response and sensitivity of the seven-fiber probe and the results predicted by the model of equal power illumination from uniangular beams presented above. The plotted points 141 are the dc displacement response (Po/Pi) of a seven-fiber probe obtained experimentally, and the curve 142 is the predicted value of Po/Pi based on the equal power model. Note that predicted value of Po/Pi 142 is about 25% higher than the experimental value and the position of the peaks do not coincide well. However, if the equal power model calculation is made with a numerical aperture value of 0.3 instead of 0.37, much better agreement is obtained. FIG. 17 compares the values 144 of the predicted Po/Pi obtained using NA=0.37 with the experimental results 143, both normalized to a maximum of 1. Such a fiber numerical aperture reduction is believed to be appropriate in order to compensate for a reduction of light power received at the photodetector due to fiber bending in the system, since any fiber bending attenuates the very high order propagating modes.

Figure 18:
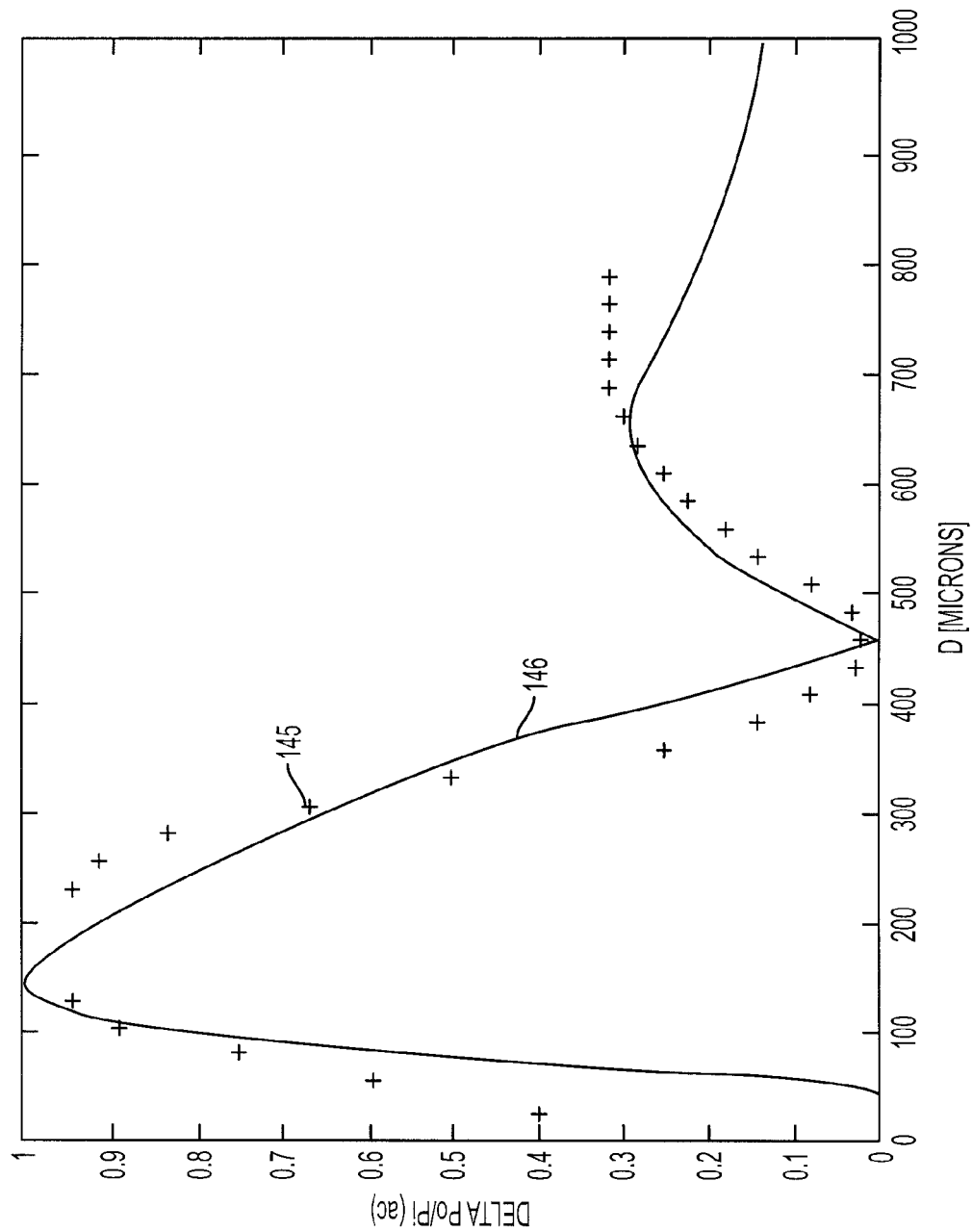
FIG. 18 compares the experimentally obtained normalized ac displacement sensitivity values with predicted results for the FIG. 1 strain sensor, using an adjusted value of numerical aperture.

FIG. 18 compares the experimentally obtained normalized ac displacement sensitivity values 145 for the 7 fiber probe of FIG. 1 as a function of the probe-reflector distance and the curve 146 obtained analytically using the equal power model and a value of 0.3 for numerical aperture. Note that the agreement between the predicted and experimental values for the ac sensitivities is fairly good, but not as good as the agreement between predicted and experimental values of the displacement responses of FIG. 18.

Evaluation of a Strain Sensor Embodiment Using a Seven Fiber Probe

Figure 19A:
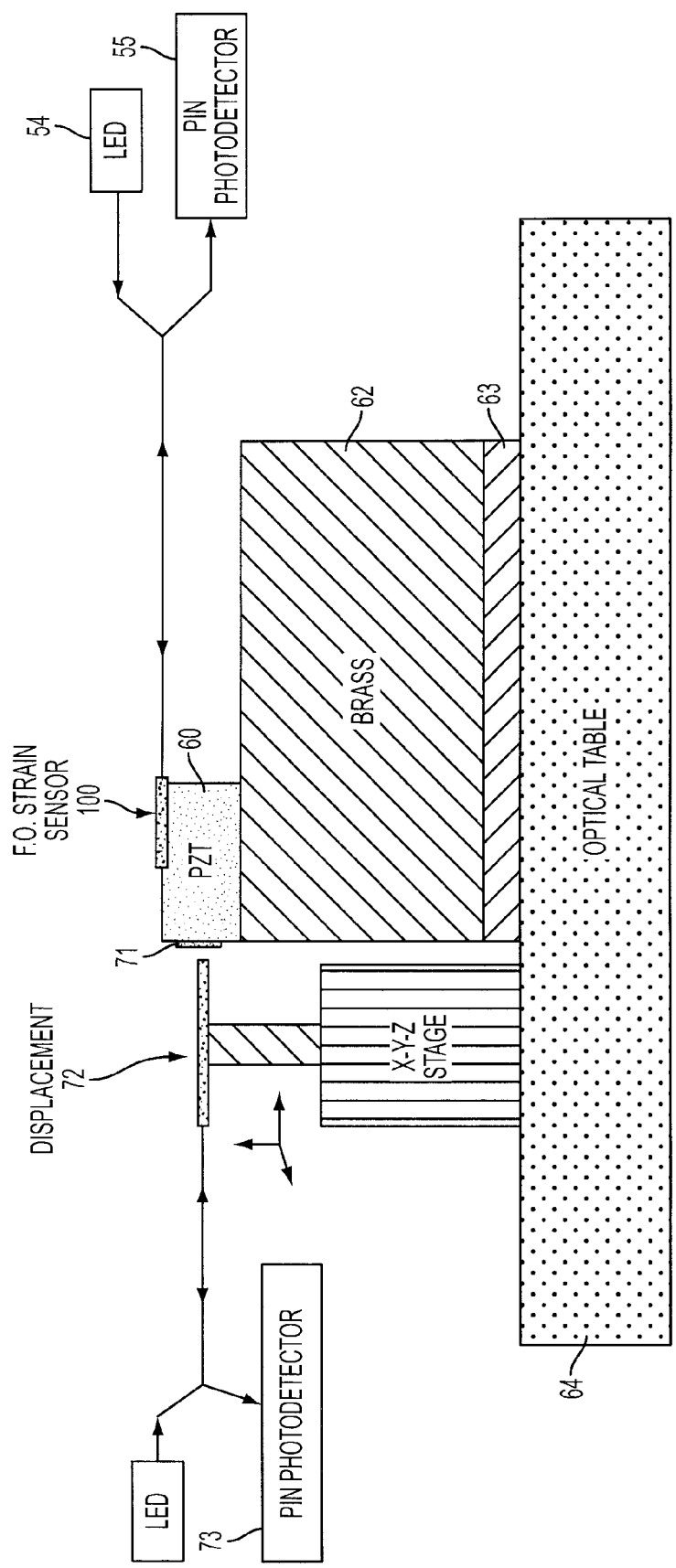
FIGS. 19A and 19B illustrate a test set-up for measuring performance of exemplary fiber optic strain sensors.
Figure 19B:
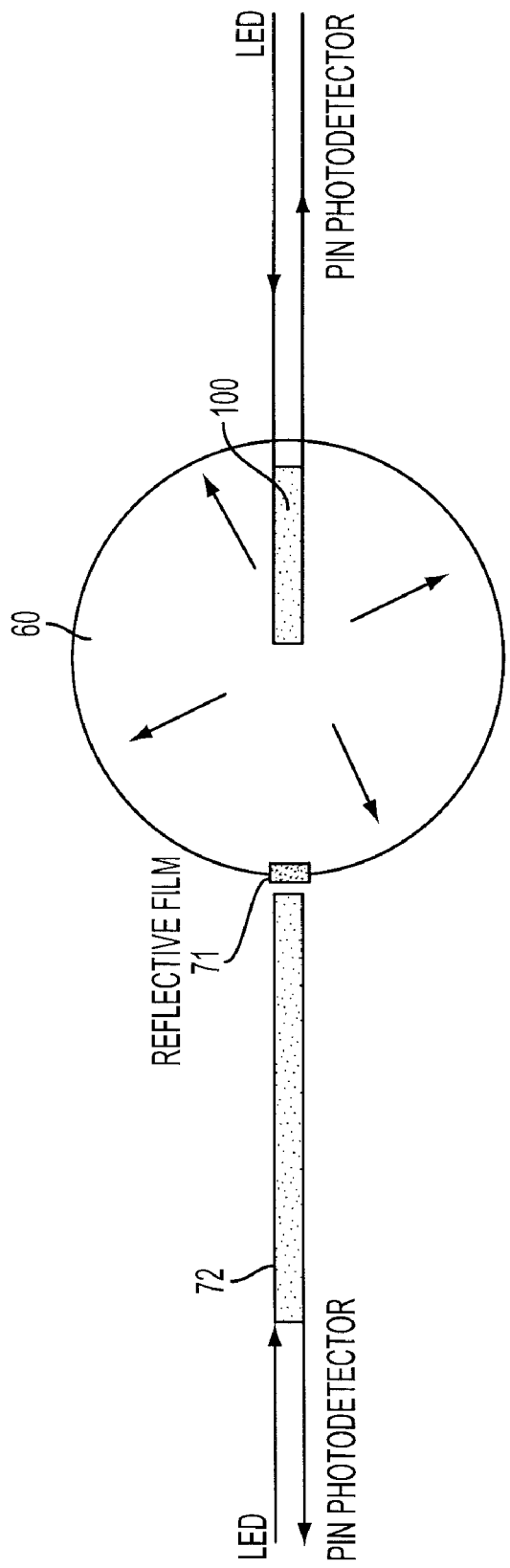

In order to measure the strain response of the seven fiber optical strain sensor 100 of FIG. 1, the whole 1.02 cm length of the sensor 100 is glued to a PZT cylinder of 1" diameter and 0.5" thickness using a cyanoacrylate adhesive. When voltage is applied at the flat surfaces of the PZT, radial strain is generated on the PZT cylinder 60, as it is shown schematically in FIGS. 19A and 19B. In this demonstration, the PZT cylinder 60 is excited by a pulse generator. About 1 mW light power is coupled into the transmitting fiber of the strain sensor 100 from the LED 54, which was driven at 100 mA. For this measurement, the photodetector 55 is a PIN silicon detector, model SD 100-41-21-231, made by Advanced Photonics. The applied ac radial strain on the stainless steel tubing 20 of the sensor 100 will modulate the sensor tube length L, which, in turn, will modulate the fiber probe end-refractive surface distance d and, thus, the detected light power.

In order to evaluate the strain measurements taken by the strain sensor system, displacement of the PZT cylinder is measured, and the strain measurements from the strain sensor 100 are compared to the measured displacement.

Displacement of the PZT cylinder 60 can be measured in any suitable manner. Some suitable displacement sensors are described in N. Lagakos and J. A. Bucaro, "*Fiber Optic Pressure and Acceleration Sensors*", Proceedings of the 47th International Instr. Symposium, Denver, Colo. (2001). In the demonstration shown in FIGS. 12A and 12B, the displacement is measured by a fiber optic displacement sensor 70. The sensor 70 includes a reflector 71 formed of a reflective mylar film with a metallized surface, glued at the side surface of the PZT cylinder 60, and a fiber optic probe 72. The fiber optic probe 72 is placed close to the reflective film 61. The output of the photodetector 71 is used to determine the lateral displacement of the outer surface of the PZT cylinder 60.

The combination of the heavy brass block 62 and the soft rubber layer 63 produces a low frequency spring-mass resonance out of the measurement range of the strain sensor 100 and displacement sensor 70.

The output signals of the fiber optic strain sensor 100 and the fiber optic displacement probe 70 are recorded and stored in a Macintosh computer using a ML750/M PowerLab recorder.

Figure 20:
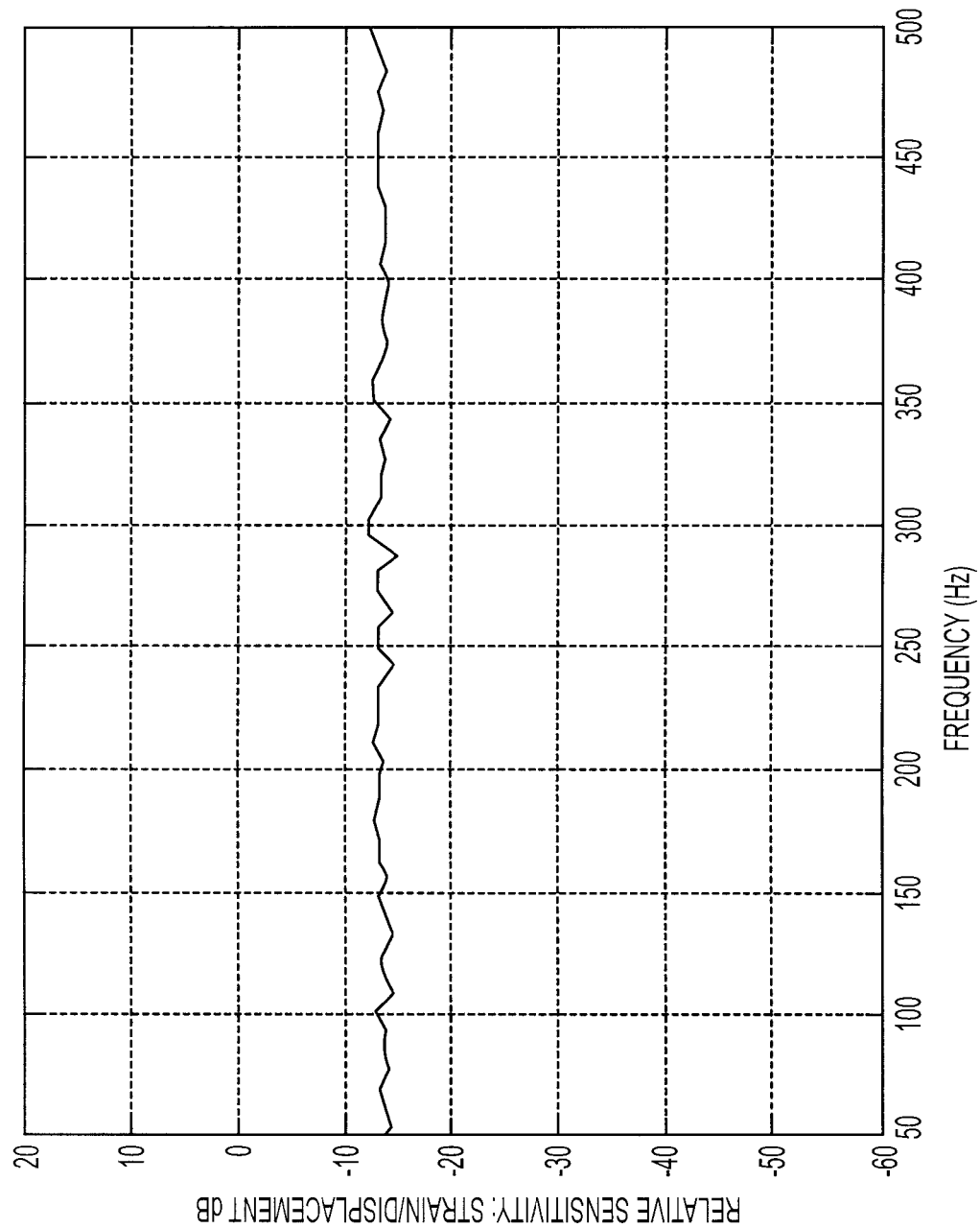
FIG. 20 is a plot of relative sensitivity of an exemplary embodiment of a fiber optic strain sensor.

The results of this demonstration are illustrated in FIG. 20, which shows the relative sensitivity (strain/displacement in dB) of the strain sensor 100 for frequencies from 50 Hz to 500 Hz. The fiber optic strain sensor frequency response is the same as the displacement sensor frequency response, however, the strain sensor output is about 14 dB lower than the output of the displacement sensor. The minimum detectable strain can be calculated based on the minimum detectable displacement, the length of the strain sensor, and the reduction in strain response compared to the displacement response. In this example, based on a 14 dB reduction, the minimum detectable displacement of 0.1 Angstroms/$(Hz)^{1/2}$ for f<5 kHz, and the 1.02 cm sensor length, the minimum detectable strain is about $5 \times 10^{-8}/(Hz)^{1/2}$.

The 14 dB loss in transmitting strain from the PZT to the strain sensor through the stainless steel tubing can be minimized if a softer than stainless steel tubing is used, such as a plastic. Examples of suitable materials include, but are not limited to, nylon, PVC, and Noryl. With a softer tubing, the minimum detectable strain is expected to approach the optimized minimum detectable strain value of $10^{-8}/(Hz)^{1/2}$.

Another important parameter is the bandwidth of the strain sensor, which is also a function of the sensor length. The output of the strain sensor is proportional to the strain integrated over the length of the sensor. Therefore, the dynamic response of the sensor extends to frequencies at which the sensor length equals lambda/2, where lambda is the wavelength of elastic waves in the sample monitored by the sensor. For example, when the sensor is used to monitor strains in a metal sheet, in which the speed of extensional waves is approximately 5500 m/sec, a sensor that is 1 cm long will respond at frequencies up to approximately 270 kHz.

Some other fiber optic sensors that use lasers as sources are dominated by 1/f laser noise at very low frequencies. In contrast, the novel fiber optic strain sensors described herein can operate well at very low frequencies, since LED's do not have any excess low frequencies noise. However, low frequency operation can also cause temperature variations to affect the results. Thus, in exemplary embodiments of the strain sensors, the tubing, the fiber probe, and the cylinder are formed of invar or other material with an extremely low coefficient of thermal expansion over the operational temperature range.

All parts of the strain sensors described herein can also be formed entirely of non-metallic materials such as polymers or glass. As an example, the reflector can be polished silica or another reflective non-metallic material.

Figure 21:
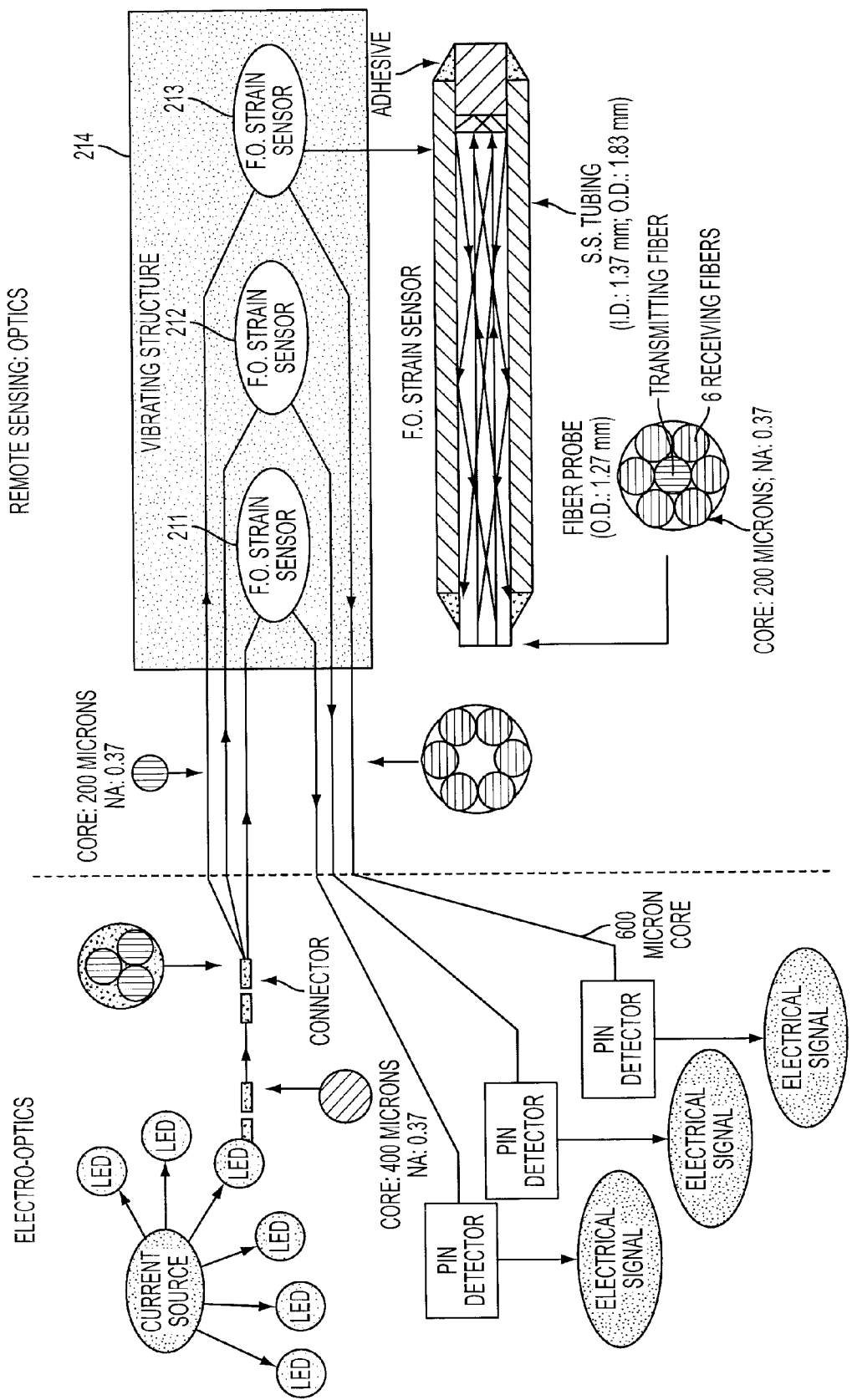
FIG. 21 illustrates an exemplary multiplexed system of strain sensors sensor in operation.

FIG. 21 illustrates an exemplary strain sensor system in which a current source powers a plurality of LEDs, and each LED transmits light into a large diameter multimode fiber. A connector splits the light from the large diameter multimode fiber into three smaller diameter multimode fibers. Each of smaller diameter multimode fibers transmits light into the transmitting fiber of a strain sensor 211, 212, and 213. These strain sensors can be the exemplary strain sensor 100 of FIG. 1. One or more fiber optic strain sensors is adhered to a structure 214 in which the strain is to be measured. Reflected light is transmitted from each of the strain sensors to a photodetector. Since the output electrical signal from the photodetector is proportional to the strain in the structure, the strain is easily determined.

The OPF370A light emitting diode manufactured by OPTEK can drive 6 LEDs at 100 mA current, which can light power 18 sensors. The current source can be powered by a battery supply or a dc/ac power supply (e.g., Acopian 12EB120; 11 V and 120 mA; $50).

One approach to coupling the LED light into the three 200 micron multimode fibers is to directly transmit the light power from the LED into the three fibers. However, this can result in significant variation in the light power in these fibers, e.g., up to 300% variation. In the exemplary embodiment of FIG. 21, a small length (~6") of a 400 micron core and 0.37 NA fiber can be used to couple the LED light into the 3 fibers of 200 micron diameter and 0.37 NA. This improves the light uniformity among fibers, to a less than 10% variation.

The signal from each of the three strain sensors 211, 212, and 213 in FIG. 21 is detected by one of the three PIN detectors. With such multiplexing it was found that the minimum detectable strain is $7 \times 10^{-9}/(Hz)^{1/2}$.

In multiplexing 6 strain sensors, light uniformity (up to 10%) is achieved by coupling the LED light to the 6 transmitting fibers of 200 micron core using a fiber of 600 micron core and 0.37 NA. With such a system 36 separate sensors can be light powered from a single LED, minimizing even further the sensor cost. With such a multiplexing it was found that the minimum detectable strain is $1 \times 10^{-8}/\sqrt{Hz}$.

The cost, size and weight, and sensitivity of the novel strain sensors described herein can be varied based on the components. The following components can provide small, lightweight, low cost sensors with very good sensitivity.

One suitable LED is the OPF370A light emitting diode manufactured by OPTEK, commercially available for approximately seven dollars apiece. This LED couples one milliwatt light power into a 100 micron core and 0.37 NA multimode fiber. A batch of LEDs can be tested, and the highest light power and lowest noise LEDs can be selected for use.

The current supply of the LED is important for minimizing noise. One suitable low noise current supply is the LDX-3620 model available from Lightwave Technologies, used in the battery mode. Another suitable low noise current supply is the 774 model, which is available from Analog Modules, and has about the same noise level as the LDX-3620. Another suitable low noise current supply is the LDD 200-1M model, available from Wavelength Electronics. Note that the LDD 200-1M is less expensive and lighter, but results in 4dB higher noise than the LDX-3620 or 744 models.

Several PIN silicon detectors are suitable for use with the strain sensors described herein. The PDA 55 model, which is available from ThorLab, and the TIA-500, which is available from Terahertz Technology, have amplification selection built into their detection system. All the detectors were studied using a battery supply as their power source for lowest noise, except for the PDA 55 which has its own ac/dc supply and which resulted in several 12 dB low frequency peaks. The inexpensive OPF 542 and OPF 560 detectors, available from OPTEK, had the lowest noise, but produced the lowest signal to noise ratio due primarily to their small sensitive area which could not capture all the light from the 6 receiving fibers for the FIG. 1 sensor. The SD100-41-21-231 model, which is available from Advanced Photonics is found to be the lease expensive detector with suitably low noise.

The transmitting and receiving optical fibers in the strain sensors can be selected based on the sensor design, and are not limited by the material, numerical aperture, or diameters of the specific examples herein. For the sensor of FIG. 1, the transmitting and the receiving fibers were commercially available and relatively inexpensive, and have a 200 micron diameter core, a 230 micron plastic clad, and a 0.37 NA. The large core and high NA optimizes the LED to fiber coupling, the fiber to fiber connection, and the sensitivity of the strain sensor. The fiber's small cladding thickness (15 micron) minimizes the size of the seven-fiber sensor of FIG. 1 and maximizes its light receiving capability.

Connectors can be selected from inexpensive commercially available connectors. These connectors include the LED mounting device, the LED-fiber ST connector, the fiber-fiber ST connector, the detector mounting device, and the 6 fiber-detector ST connector.

FIG. 22 shows a cost and weight analysis for a seven-fiber strain sensor of FIG. 1 and FIG. 21, using currently available components and prices. The cost of the sensor system of FIG. 21 is primarily due to the detector. A lower cost detector can be used to reduce the sensor cost. For example, some good PIN detectors cost no more than about seven dollars.

A significant cost reduction can be also achieved by detecting together the 3 multiplexed sensors using one detector. Such an optical detection system not only reduces the cost of the sensor ($34.17) but also it does not introduce any additional time delay to the detection process. For remote sensing, a fiber with 600 micron diameter core and 0.37 NA can couple light well from the sensor 6 receiving fibers adding only an 1 dB excess loss.

FIG. 23 compares the novel fiber optic strain sensors described herein to other currently available strain sensor technologies discussed in the Background section above, in terms of current source, minimum detectable strain, and ease of multiplexing more than one strain sensors.

Note that in some instances, it is desirable that only a portion of the strain in the material be transmitted from the material to the strain sensor. The fiber optic strain sensor can be desensitized to the material strain by one or more of the following modifications. The glue used to attach the housing to the fiber sensor and to the reflector can be an adhesive that is softer, so it transmits less of the strain in the material to the housing. The attachment points between the housing and the fiber probe and reflector body can be located closer together, rather than at the precise ends of the housing, causing less of the strain to be transmitted from the test material to the housing. A sensor with either or both of these features will have decreased sensitivity and increased bandwidth.

Obviously, many modifications and variations of the present invention are possible in light of the above teachings. It is therefore to be understood that the claimed invention may be practiced otherwise than as specifically described.

What is claimed as new and desired to be protected by Letters Patent of the United States is:

1. A sensor for measuring strain in a material to which the sensor is attached, the sensor including:
   a reflector body with a reflective surface;
   an optical fiber probe including a first multimode optical fiber for transmitting light through the fiber and emitting light from an end of the fiber and at least one other multimode optical fiber for receiving light reflected by the reflector body;
   the reflective surface being spaced apart at a distance d from the end of the multimode optical fibers and positioned to receive the light emitted from the end of the first multimode optical fiber and to reflect at least a portion of the light into the end of the at least one other multimode optical fiber; and
   a housing affixed to the optical fiber probe at a first location and affixed to the reflector body at a second location, the distance L between the first location and the second location being greater than the distance d,
   wherein in operation, the housing is affixed to the material, strain in the material is transmitted to the housing and causes a change in the distance d between the multimode optical fiber ends and the reflective surface, and said change in the distance d modulates the amount of light received in the at least one other multimode optical fiber.

2. The sensor of claim 1, wherein the at least one other multimode optical fiber includes a plurality of multimode receiving optical fibers arranged surrounding the first multimode optical fiber.

3. The sensor of claim 2, wherein said plurality of multimode receiving optical fibers includes six multimode receiving optical fibers.

4. The sensor of claim 1, further including an LED light source for transmitting light into the first multimode optical fiber.

5. The sensor of claim 1, further comprising:
   a photodetector in optical communication with the at least one other multimode optical fiber, arranged to convert the received light into an electrical output, said output being indicative of the strain in the material.

6. The sensor of claim 5, wherein the output is substantially wavelength independent.

7. The sensor of claim 1, wherein said reflective surface includes metallization on a metallic reflector body.

8. The sensor of claim 1, wherein the housing comprises stainless steel and the reflector body comprises aluminum.

9. The sensor of claim 1, wherein the housing and reflector body are free of metals.

10. A sensor for measuring strain in a material to which the sensor is attached, the sensor including:
    a reflector body with a reflective surface;
    an optical fiber probe including at least one optical fiber for transmitting light through the fiber and emitting the light from an end of the fiber;
    the reflective surface being spaced apart at a distance d from the end of the optical fiber and positioned to receive the light emitted from the end of the optical fiber and to reflect at least a portion of the light into the optical fiber; and a housing affixed to the optical fiber probe at a first location and affixed to the reflector body at a second location, the distance L between the first location and the second location being greater than the distance d, wherein in operation, the housing is affixed to the material, strain in the material is transmitted to the housing and causes a change in the distance d between the fiber ends and the reflective surface, and said change in the distance d modulates the amount of light received in the optical fiber, wherein the housing and reflector body comprise invar.

11. A sensor for measuring strain in a material to which the sensor is attached, the sensor including:

a reflector body with a reflective surface;

an optical fiber probe including at least one optical fiber for transmitting light through the fiber and emitting the light from an end of the fiber;

the reflective surface being spaced apart at a distance d from the end of the optical fibers and positioned to receive the light emitted from the end of the optical fiber and to reflect at least a portion of the light into the optical fiber; and a housing affixed to the optical fiber probe at a first location and affixed to the reflector body at a second location, the distance L between the first location and the second location being greater than the distance d, wherein in operation, the housing is affixed to the material, strain in the material is transmitted to the housing and causes a change in the distance d between the fiber ends and the reflective surface, and said change in the distance d modulates the amount of light received in the optical fiber, wherein the sensitivity is approximately constant over a frequency range of 50 to 500 Hz.

12. The sensor of claim 1, wherein the strain sensor is free of fiber gratings.

13. A sensor for measuring strain in a material to which the sensor is attached, the sensor including:

a reflector body with a reflective surface;

an optical fiber probe including a first multimode optical fiber and at least one other multimode optical fiber; and a housing affixed to the optical fiber probe at a first end of the housing and affixed to the reflector body at a second end of the housing, the reflective surface spaced apart at a distance d from the ends of the fibers and positioned to receive light from the end of the first multimode optical fiber and to reflect at least a portion of the light into the end of the at least one other multimode optical fiber, wherein in operation, the housing is affixed to the material, strain in the material is transmitted to the housing and causes a change in the distance d between the fiber end and the reflective surface, and said change in the distance d modulates the amount of light received in the at least one other multimode optical fiber.

14. The sensor of claim 13, wherein the at least one other multimode optical fiber includes a plurality of multimode optical fibers arranged surrounding the first multimode optical fiber.

15. The sensor of claim 14, wherein the includes six receiving fibers.

16. The sensor of claim 13, further including an LED light source for transmitting light into the first multimode optical fiber.

17. The sensor of claim 13, further comprising:

a photodetector in optical communication with the at least one other multimode optical fiber, arranged to convert the received light into an electrical output, said output being indicative of the strain in the material.

18. The sensor of claim 17, wherein the output is substantially wavelength independent.

19. The sensor of claim 13, wherein said reflective surface includes metallization on a metallic reflector body.

20. The sensor of claim 13, wherein the housing comprises stainless steel and the reflector body comprises aluminum.

21. A sensor for measuring strain in a material to which the sensor is attached, the sensor including:

an optical fiber probe including at least one optical fiber;

a reflector body with a reflective surface, the reflective surface spaced apart at a distance d from the ends of the fibers and positioned to receive light from the end of the fiber and to reflect at least a portion of the light into the end of the fiber; and a housing affixed to the optical fiber probe at a first end of the housing and affixed to the reflector body at a second end of the housing, wherein in operation, the housing is affixed to the material, strain in the material is transmitted to the housing and causes a change in the distance d between the fiber end and the reflective surface, and said change in the distance d modulates the amount of light received in the fiber, wherein the housing and reflector body comprise invar.

22. The sensor of claim 13, wherein the housing and reflector body are free of metals.

23. A sensor for measuring strain in a material to which the sensor is attached, the sensor including:

an optical fiber probe including at least one optical fiber;

a reflector body with a reflective surface, the reflective surface spaced apart at a distance d from the ends of the fibers and positioned to receive light from the end of the fiber and to reflect at least a portion of the light into the end of the fiber; and a housing affixed to the optical fiber probe at a first end of the housing and affixed to the reflector body at a second end of the housing, wherein in operation, the housing is affixed to the material, strain in the material is transmitted to the housing and causes a change in the distance d between the fiber end and the reflective surface, and said change in the distance d modulates the amount of light received in the fiber, wherein the sensitivity is approximately constant over a frequency range of 50 to 500 Hz.

24. The sensor of claim 13, wherein the strain sensor is free of fiber gratings.

25. The sensor according to claim 1, wherein in operation, the entire length of the sensor housing is affixed to the material.

26. The sensor according to claim 13, wherein in operation, the entire length of the sensor housing is affixed to the material.

* * * * *